US012792329B2

(12) United States Patent
Starszyk et al.

(10) Patent No.: US 12,792,329 B2
(45) Date of Patent: Nov. 10, 2026

(54) AUTOMATED COMPONENT DEPLOYMENT RECOMMENDATIONS FOR ARTIFICIAL INTELLIGENCE PRODUCTION PIPELINE ORCHESTRATION

(71) Applicant: The Toronto-Dominion Bank, Toronto (CA)

(72) Inventors: Peter Starszyk, Waterloo (CA); Devinder Kumar, Toronto (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 245 days.

(21) Appl. No.: 18/817,285

(22) Filed: Aug. 28, 2024

(65) Prior Publication Data

US 2026/0064394 A1 Mar. 5, 2026

(51) Int. Cl.
*G06F 8/60* (2018.01)
*G06F 8/71* (2018.01)

(52) U.S. Cl.
CPC . *G06F 8/60* (2013.01); *G06F 8/71* (2013.01)

(58) Field of Classification Search
None
See application file for complete search history.

(56) References Cited

U.S. PATENT DOCUMENTS 9,864,982 B2 1/2018 Bristow et al.
10,163,085 B2 12/2018 D'Agostino et al.
10,178,246 B1 1/2019 Horvath et al.
10,181,114 B2 1/2019 Tseretopoulos et al.
10,339,931 B2 7/2019 Tseretopoulos et al.
10,346,824 B2 7/2019 Chan et al.
10,360,303 B2 7/2019 Volkovs et al.
10,405,146 B1 9/2019 Kuruvilla et al.
10,438,206 B2 10/2019 Jivraj et al.
10,440,196 B2 10/2019 Horvath et al.
10,440,197 B2 10/2019 Horvath et al.
(Continued)

OTHER PUBLICATIONS

Garg, "On Continuous Integration / Continuous Delivery for Automated Deployment of Machine Learning Models using MLOps", 2021, IEEE (Year: 2021).*
(Continued)

*Primary Examiner* — Hossain M Morshed

(57) ABSTRACT

An example operation may include one or more of storing utility components within a storage of a software application, receiving a configuration file defining component configurations, receiving an artificial intelligence (AI) model which comprises at least one of source code, binary code, software end points, and configuration information, wrapping the AI model into a wrapped AI model that includes an interface that provides access to the AI model, generating a production pipeline for the AI model which includes a sequence of components including the wrapped AI model and at least one utility component connected to the interface based on the component configurations included in the configuration file, and executing the production pipeline for the AI model on input data via the software application to generate an inference result. The example operation may further include an AI agent modifying the configuration file for the production pipeline to generate the inference result.

20 Claims, 14 Drawing Sheets

(56) References Cited

U.S. PATENT DOCUMENTS 10,460,748 B2 10/2019 Tseretopoulos et al.
10,482,675 B1 11/2019 Sutter et al.
10,659,400 B2 5/2020 Moon et al.
10,698,902 B2 6/2020 Tseretopoulos et al.
10,706,635 B2 7/2020 Sutter et al.
10,708,721 B2 7/2020 Kuruvilla et al.
10,728,259 B2 7/2020 McCarter et al.
10,776,619 B2 9/2020 Collinson et al.
10,824,941 B2 11/2020 Volkovs et al.
10,831,923 B2 11/2020 Dunjic et al.
10,832,047 B2 11/2020 Moghtadai
10,862,897 B2 12/2020 D'Agostino et al.
10,867,292 B2 12/2020 Lin et al.
10,867,293 B2 12/2020 Bristow et al.
10,878,816 B2 12/2020 Tseretopoulos et al.
10,902,220 B2 1/2021 Lozon et al.
10,922,665 B2 2/2021 Miller et al.
10,943,605 B2 3/2021 Tseretopoulos et al.
10,977,617 B2 4/2021 Tseretopoulos et al.
11,004,187 B2 5/2021 Kuruvilla et al.
11,017,028 B2 5/2021 Dunjic et al.
11,030,415 B2 6/2021 Volkovs et al.
11,055,924 B2 7/2021 Navarro et al.
11,061,638 B2 7/2021 Lam
11,070,448 B2 7/2021 Miller et al.
11,087,314 B2 8/2021 Gandhi et al.
11,100,168 B2 8/2021 Miller et al.
11,140,143 B2 10/2021 Moon et al.
11,144,921 B2 10/2021 Dunjic et al.
11,144,998 B2 10/2021 Kuruvilla et al.
11,145,169 B2 10/2021 Pratten et al.
11,182,860 B2 11/2021 Kuruvilla et al.
11,200,328 B2 12/2021 Shpurov et al.
11,200,411 B2 12/2021 Rizvi et al.
11,210,857 B2 12/2021 Rizvi et al.
11,222,286 B2 1/2022 Choe et al.
11,232,304 B2 1/2022 Navarro et al.
11,276,257 B2 3/2022 Moghtadai et al.
11,303,642 B2 4/2022 Dunjic et al.
11,334,574 B2 5/2022 Caputo et al.
11,347,744 B2 5/2022 Tseretopoulos et al.
11,349,871 B2 5/2022 Moon et al.
11,354,442 B2 6/2022 Haldenby et al.
11,361,566 B2 6/2022 Collinson et al.
11,373,229 B2 6/2022 Tseretopoulos et al.
11,392,776 B2 7/2022 Lozon et al.
11,393,020 B2 7/2022 Mathew et al.
11,394,668 B1 7/2022 Subbunarayanan et al.
11,397,765 B2 7/2022 Volkovs et al.
11,409,811 B2 8/2022 D'Agostino
11,411,734 B2 8/2022 Shpurov et al.
11,430,242 B2 8/2022 Moghtadai
11,436,809 B2 9/2022 Rizvi et al.
11,451,669 B1 9/2022 Navarro et al.
11,469,878 B2 10/2022 Shpurov et al.
11,470,091 B2 10/2022 McCarter et al.
11,470,143 B2 10/2022 Joheb et al.
11,475,059 B2 10/2022 Liu et al.
11,475,251 B2 10/2022 Morin et al.
11,477,265 B2 10/2022 McPhee et al.
11,507,622 B2 11/2022 Grebenisan et al.
11,507,868 B2 11/2022 Kwong et al.
11,546,345 B2 1/2023 D'Agostino et al.
11,580,762 B2 2/2023 Rizvi et al.
11,600,064 B2 3/2023 Navarro et al.
11,604,899 B2 3/2023 Haldenby et al.
11,620,741 B2 4/2023 Kuruvilla et al.
11,632,311 B2 4/2023 Miller et al.
11,651,100 B2 5/2023 Dunjic et al.
11,663,488 B2 5/2023 Volkovs et al.
11,671,536 B2 6/2023 Navarro et al.
11,687,995 B2 6/2023 Tseretopoulos et al.
11,689,484 B2 6/2023 Moon et al.
11,704,782 B2 7/2023 Wakim et al.
11,741,305 B2 8/2023 Skaljin et al.
11,743,210 B2 8/2023 Moon et al.
11,748,400 B2 9/2023 Volkovs et al.
11,756,388 B2 9/2023 Pratten et al.
11,777,918 B2 10/2023 Moon et al.
11,782,935 B2 10/2023 Caputo et al.
11,789,909 B2 10/2023 Grebenisan et al.
11,790,012 B2 10/2023 D'Agostino
11,790,354 B2 10/2023 Gandhi et al.
11,797,962 B2 10/2023 Jones et al.
11,809,486 B2 11/2023 Liu et al.
11,809,577 B2 11/2023 Begg et al.
11,811,826 B2 11/2023 Moon et al.
11,842,252 B2 12/2023 Kuang et al.
11,875,398 B2 1/2024 Pratten et al.
11,880,811 B2 1/2024 Pawelkiewicz et al.
11,886,764 B2 1/2024 Lam
11,928,112 B2 3/2024 Dunjic et al.
11,941,525 B2 3/2024 Morin et al.
11,941,703 B2 3/2024 Kuruvilla et al.
11,955,117 B2 4/2024 McDermid et al.
11,966,491 B2 4/2024 D'Agostino
11,978,085 B2 5/2024 Rai et al.
11,978,090 B2 5/2024 Navarro et al.
11,985,153 B2 5/2024 Karl
11,995,121 B2 5/2024 Volkovs et al.
12,008,315 B2 6/2024 Miller et al.
12,014,303 B2 6/2024 Carvalho et al.
12,019,594 B2 6/2024 Floyd et al.
12,021,874 B2 6/2024 Dunjic et al.
12,039,535 B2 7/2024 Dunjic et al.
12,052,363 B2 7/2024 Shpurov et al.
12,061,652 B2 8/2024 Miller et al.
12,067,130 B2 8/2024 Shpurov et al.
12,067,580 B2 8/2024 Jeske et al.
12,079,351 B2 9/2024 Begg et al.
12,106,220 B2 10/2024 Volkovs et al.
12,111,793 B2 10/2024 Grebenisan et al.
12,124,925 B2 10/2024 Rho et al.
12,136,079 B2 11/2024 Jones et al.
12,164,542 B1 12/2024 Rahman et al.
12,169,693 B2 12/2024 Lu
12,182,800 B2 12/2024 Navarro et al.
12,198,109 B2 1/2025 Abbas
12,198,510 B2 1/2025 Pratten et al.
12,210,534 B2 1/2025 Cashion et al.
12,211,274 B2 1/2025 Ma et al.
12,217,011 B2 2/2025 Luo et al.
12,223,549 B2 2/2025 Bouëttéet al.
12,229,690 B2 2/2025 Stanevich et al.
12,254,512 B2 3/2025 Heglin et al.
12,282,785 B2 4/2025 Karbasi et al.
12,288,236 B2 4/2025 Volkovs et al.
12,299,149 B2 5/2025 Nikoghossian et al.
12,316,715 B2 5/2025 Taheri et al.
12,321,861 B2 6/2025 Volkovs et al.
12,326,856 B2 6/2025 Mohammed et al.
12,333,354 B2 6/2025 Mohammed et al.
12,353,969 B2 7/2025 Kuang et al.
12,354,094 B2 7/2025 Jones et al.
12,373,795 B2 7/2025 Misler et al.
2018/0268818 A1 9/2018 Schoenmackers et al.
2019/0172045 A1 6/2019 Dunjic et al.
2020/0058068 A1 2/2020 Gandhi et al.
2021/0027160 A1 1/2021 Volkovs et al.
2021/0037040 A1 2/2021 Aleks et al.
2021/0117893 A1 4/2021 Sohum et al.
2021/0232950 A1 7/2021 Kono
2021/0264461 A1 8/2021 Fam
2021/0407016 A1 12/2021 Kuruvilla et al.
2022/0058489 A1 2/2022 Volkovs et al.
2022/0108069 A1 4/2022 Lee
2022/0157094 A1 5/2022 Moghtadai et al.
2022/0172083 A1 6/2022 Wu et al.
2022/0188705 A1 6/2022 Davoodi et al.
2022/0198411 A1 6/2022 Jones et al.
2022/0198432 A1 6/2022 Jones et al.
2022/0198445 A1 6/2022 Jones et al.
2022/0207295 A1 6/2022 Stanevich et al.
2022/0207430 A1 6/2022 Dickie et al.

(56) References Cited

U.S. PATENT DOCUMENTS

2022/0207432 A1 6/2022 Whelan et al.
2022/0207606 A1 6/2022 Dickie et al.
2022/0245060 A1 8/2022 Kathuria et al.
2022/0270155 A1 8/2022 Volkovs et al.
2022/0277213 A1 9/2022 Braviner et al.
2022/0277227 A1 9/2022 Yu et al.
2022/0277323 A1 9/2022 Whelan et al.
2022/0284450 A1 9/2022 Asta et al.
2022/0300903 A1 9/2022 Huang et al.
2022/0309573 A1 9/2022 Mathew et al.
2022/0318573 A1 10/2022 Smith et al.
2022/0318617 A1 10/2022 Wong et al.
2022/0327397 A1 10/2022 Braviner et al.
2022/0327430 A1 10/2022 Zuberi et al.
2022/0327431 A1 10/2022 Braviner et al.
2022/0327432 A1 10/2022 Gutierrez Bugarin et al.
2022/0327625 A1 10/2022 Leung et al.
2022/0335718 A1 10/2022 Ma et al.
2022/0343422 A1 10/2022 Zuberi et al.
2022/0366064 A1 11/2022 Nikoghossian et al.
2022/0383301 A1 12/2022 Jones et al.
2022/0383313 A1 12/2022 Jones et al.
2022/0383314 A1 12/2022 Jones et al.
2022/0405299 A1 12/2022 Leung et al.
2022/0414495 A1 12/2022 Stanevich et al.
2023/0006809 A1 1/2023 Shpurov et al.
2023/0007075 A1 1/2023 Mcphee et al.
2023/0011451 A1 1/2023 Lu
2023/0048437 A1 2/2023 Karbasi et al.
2023/0083899 A1 3/2023 Gandouet et al.
2023/0086653 A1 3/2023 Zykh et al.
2023/0107703 A1 4/2023 Zhang et al.
2023/0113752 A1 4/2023 Jorlett et al.
2023/0119108 A1 4/2023 Volkovs et al.
2023/0131935 A1 4/2023 Volkovs et al.
2023/0153461 A1 5/2023 Kalra et al.
2023/0195734 A1 6/2023 Cashion et al.
2023/0196406 A1 6/2023 Gandouet et al.
2023/0244917 A1 8/2023 Loaiza Ganem et al.
2023/0244962 A1 8/2023 Volkovs et al.
2023/0252301 A1 8/2023 Volkovs et al.
2023/0259883 A1 8/2023 Misler et al.
2023/0267367 A1 8/2023 Volkovs et al.
2023/0267475 A1 8/2023 Navarro et al.
2023/0306434 A1 9/2023 Dunjic et al.
2023/0316485 A1 10/2023 Wakim et al.
2023/0318994 A1 10/2023 Moon et al.
2023/0336615 A1 10/2023 Joheb et al.
2023/0342481 A1 10/2023 Nikoghossian et al.
2023/0344814 A1 10/2023 Moon et al.
2023/0351116 A1 11/2023 Skaljin et al.
2023/0368048 A1 11/2023 Yang et al.
2023/0377047 A1 11/2023 Bouëttéet al.
2023/0385693 A1 11/2023 Cresswell et al.
2023/0385694 A1 11/2023 Cresswell et al.
2023/0386190 A1 11/2023 Cresswell et al.
2023/0394452 A1 12/2023 Jones et al.
2023/0401192 A1 12/2023 Yang et al.
2023/0401553 A1 12/2023 Navarro et al.
2023/0401572 A1 12/2023 Navarro et al.
2023/0419302 A1 12/2023 Navarro et al.
2023/0419402 A1 12/2023 Ghelichi et al.
2024/0020534 A1 1/2024 Perez Vallejo et al.
2024/0054366 A1* 2/2024 Li .......................... G06N 20/00
2024/0062117 A1 2/2024 Kuang et al.
2024/0106851 A1 3/2024 Kennedy et al.
2024/0119346 A1 4/2024 Chang et al.
2024/0126575 A1 4/2024 Kiriakou et al.
2024/0127036 A1 4/2024 Zuberi et al.
2024/0127214 A1 4/2024 Wander et al.
2024/0193562 A1 6/2024 Pratten et al.
2024/0202756 A1 6/2024 Karl et al.
2024/0203405 A1 6/2024 McDermid et al.
2024/0211732 A1 6/2024 Wander et al.
2024/0212049 A1 6/2024 Ghelichi et al.
2024/0220653 A1 7/2024 D'Agostino
2024/0232614 A1 7/2024 Esmaeili et al.
2024/0232950 A1 7/2024 Navarro et al.
2024/0249310 A1 7/2024 Rai et al.
2024/0256903 A1 8/2024 Ens et al.
2024/0256904 A1 8/2024 Leung et al.
2024/0256968 A1 8/2024 Hosseinzadeh et al.
2024/0265055 A1 8/2024 Purkayastha
2024/0281467 A1 8/2024 Volkovs et al.
2024/0281808 A1 8/2024 Vouitsis et al.
2024/0281818 A1 8/2024 Golestan Irani et al.
2024/0289645 A1 8/2024 Makhijani et al.
2024/0289876 A1 8/2024 Mathew et al.
2024/0303551 A1 9/2024 Li et al.
2024/0304182 A1 9/2024 Hamilton et al.
2024/0320036 A1* 9/2024 Nandakumar ............ G06F 8/34
2024/0330772 A1 10/2024 Cresswell et al.
2024/0330809 A1 10/2024 Carvalho et al.
2024/0338520 A1 10/2024 Misler et al.
2024/0346338 A1 10/2024 Desai et al.
2024/0370880 A1 11/2024 Jeske et al.
2024/0370881 A1 11/2024 Jeske et al.
2024/0385838 A1 11/2024 Yu et al.
2024/0386295 A1 11/2024 Yu et al.
2024/0386325 A1 11/2024 Yu et al.
2024/0386326 A1 11/2024 Yu et al.
2024/0386427 A1 11/2024 Abbas et al.
2024/0394569 A1 11/2024 Farhadi Hassan Kiadeh et al.
2024/0394588 A1 11/2024 Heglan et al.
2024/0403702 A1 12/2024 Deljavan Farshi
2024/0403862 A1 12/2024 Abbas et al.
2024/0412069 A1 12/2024 Volkovs et al.
2024/0412078 A1 12/2024 Ghelichi et al.
2024/0412083 A1 12/2024 Starszyk et al.
2024/0419978 A1 12/2024 Stein et al.
2024/0420010 A1 12/2024 Cirulis et al.
2024/0420011 A1 12/2024 Cirulis et al.
2024/0428283 A1 12/2024 Belbahri et al.
2025/0013363 A1 1/2025 Estoesta et al.
2025/0013697 A1 1/2025 Estoesta et al.
2025/0013927 A1 1/2025 Rho et al.
2025/0014010 A1 1/2025 Jones et al.
2025/0014052 A1 1/2025 Bhattacharjee et al.
2025/0028852 A1 1/2025 Chowanski et al.
2025/0028934 A1 1/2025 Wong et al.
2025/0029012 A1 1/2025 Rho et al.
2025/0045601 A1 2/2025 Zuberi et al.
2025/0053387 A1 2/2025 Wang et al.
2025/0068646 A1 2/2025 Rahman et al.
2025/0068853 A1 2/2025 Lu
2025/0069063 A1 2/2025 Navarro et al.
2025/0077187 A1 3/2025 Guttridge et al.
2025/0077188 A1 3/2025 Guttridge et al.
2025/0077189 A1 3/2025 Guttridge et al.
2025/0077190 A1 3/2025 Guttridge et al.
2025/0077204 A1 3/2025 Guttridge et al.
2025/0077227 A1 3/2025 Guttridge et al.
2025/0077396 A1 3/2025 Sen
2025/0077397 A1 3/2025 Sen
2025/0077399 A1 3/2025 Sen
2025/0077400 A1 3/2025 Sen
2025/0077556 A1 3/2025 Guttridge et al.
2025/0077681 A1 3/2025 Sen
2025/0077682 A1 3/2025 Guttridge et al.
2025/0077939 A1 3/2025 Tabatabaei et al.
2025/0078324 A1 3/2025 Gormley
2025/0078325 A1 3/2025 Gormley
2025/0078344 A1 3/2025 Gormley
2025/0078345 A1 3/2025 Gormley
2025/0078972 A1 3/2025 Gormley
2025/0085936 A1 3/2025 Guttridge et al.
2025/0086096 A1 3/2025 Guttridge et al.
2025/0086440 A1 3/2025 Erb et al.
2025/0086441 A1 3/2025 Guttridge et al.
2025/0086451 A1 3/2025 Guttridge et al.
2025/0086551 A1 3/2025 Zhao
2025/0094437 A1 3/2025 Upendran
2025/0103609 A1 3/2025 Upendran
2025/0103961 A1 3/2025 Cresswell et al.

(56) References Cited

U.S. PATENT DOCUMENTS

| | | | | |
|---|---|---|---|---|
| 2025/0103980 | A1 | 3/2025 | Deljavan Farshi et al. | |
| 2025/0104024 | A1 | 3/2025 | Abbas | |
| 2025/0104029 | A1 | 3/2025 | Deljavan Farshi et al. | |
| 2025/0104047 | A1 | 3/2025 | Mashkevich | |
| 2025/0104050 | A1 | 3/2025 | Mashkevich | |
| 2025/0104059 | A1 | 3/2025 | Mashkevich | |
| 2025/0104074 | A1 | 3/2025 | Tsang et al. | |
| 2025/0104306 | A1 | 3/2025 | Mashkevich | |
| 2025/0104700 | A1 | 3/2025 | Henault-Ethier et al. | |
| 2025/0106060 | A1 | 3/2025 | Gormley et al. | |
| 2025/0106201 | A1 | 3/2025 | Gormley | |
| 2025/0110805 | A1 | 4/2025 | Starszyk et al. | |
| 2025/0117411 | A1 | 4/2025 | Mohammed | |
| 2025/0117595 | A1 | 4/2025 | Taheri | |
| 2025/0117596 | A1 | 4/2025 | Taheri | |
| 2025/0117623 | A1 | 4/2025 | Devarajan et al. | |
| 2025/0117629 | A1 | 4/2025 | Pandey et al. | |
| 2025/0117630 | A1 | 4/2025 | Taheri | |
| 2025/0117769 | A1 | 4/2025 | Taheri | |
| 2025/0117836 | A1 | 4/2025 | Taheri et al. | |
| 2025/0117853 | A1 | 4/2025 | Pandey et al. | |
| 2025/0117854 | A1 | 4/2025 | Pandey et al. | |
| 2025/0117855 | A1 | 4/2025 | Pandey et al. | |
| 2025/0117856 | A1 | 4/2025 | Pandey et al. | |
| 2025/0119396 | A1 | 4/2025 | Taheri | |
| 2025/0119494 | A1 | 4/2025 | Pandey et al. | |
| 2025/0119495 | A1 | 4/2025 | Pandey et al. | |
| 2025/0124039 | A1 | 4/2025 | Cashion et al. | |
| 2025/0124240 | A1 | 4/2025 | Luo et al. | |
| 2025/0131718 | A1 | 4/2025 | Ma et al. | |
| 2025/0138838 | A1 | 5/2025 | Ramesh et al. | |
| 2025/0139267 | A1 | 5/2025 | Zykh et al. | |
| 2025/0139382 | A1 | 5/2025 | Mohammed et al. | |
| 2025/0139708 | A1 | 5/2025 | Bouëttéet al. | |
| 2025/0147733 | A1 | 5/2025 | Abbas et al. | |
| 2025/0148321 | A1 | 5/2025 | Stanevich et al. | |
| 2025/0165375 | A1 | 5/2025 | Cresswell et al. | |
| 2025/0165866 | A1 | 5/2025 | Cresswell et al. | |
| 2025/0173170 | A1 | 5/2025 | Glynn-Udrow et al. | |
| 2025/0173568 | A1 | 5/2025 | Cresswell et al. | |
| 2025/0173618 | A1 | 5/2025 | Cresswell et al. | |
| 2025/0173619 | A1 | 5/2025 | Cresswell et al. | |
| 2025/0173725 | A1 | 5/2025 | Devarajan et al. | |
| 2025/0181321 | A1 | 6/2025 | Gormley | |
| 2025/0182028 | A1 | 6/2025 | Gormley | |
| 2025/0182196 | A1 | 6/2025 | Gormley | |
| 2025/0182222 | A1 | 6/2025 | Gormley | |
| 2025/0191062 | A1 | 6/2025 | Heglin et al. | |
| 2025/0217175 | A1 | 7/2025 | Karbasi et al. | |
| 2025/0225560 | A1 | 7/2025 | Bajaj et al. | |
| 2025/0231668 | A1 | 7/2025 | Tao et al. | |
| 2025/0231750 | A1 | 7/2025 | Lim et al. | |
| 2025/0231774 | A1 | 7/2025 | Tao et al. | |
| 2025/0231775 | A1 | 7/2025 | Tao et al. | |
| 2025/0231793 | A1 | 7/2025 | Lim et al. | |
| 2025/0232130 | A1 | 7/2025 | Tao et al. | |
| 2025/0232351 | A1 | 7/2025 | Tao et al. | |
| 2025/0232375 | A1 | 7/2025 | Tao et al. | |
| 2025/0232376 | A1 | 7/2025 | Tao et al. | |
| 2025/0232377 | A1 | 7/2025 | Tao et al. | |
| 2025/0232503 | A1 | 7/2025 | Lim et al. | |
| 2025/0238536 | A1 | 7/2025 | Nikoghossian et al. | |
| 2025/0245071 | A1 | 7/2025 | Ionescu et al. | |
| 2025/0245511 | A1 | 7/2025 | D'Agostino et al. | |
| 2025/0252359 | A1* | 8/2025 | Pesala | G06N 20/20 |
| 2026/0064370 | A1* | 3/2026 | Starszyk | G06F 8/10 |
| 2026/0064394 | A1* | 3/2026 | Starszyk | G06F 8/60 |
| 2026/0119997 | A1* | 4/2026 | Rao | G06N 20/00 |

OTHER PUBLICATIONS

Prado, "Bonseyes AI Pipeline—Bringing AI to You: End-to-end integration of data, algorithms, and deployment tools", 2020, ACM (Year: 2020).*

Tabassam, "MLOps: A Step Forward to Enterprise Machine Learning", 2023, arxiv.org (Year: 2023).*

Heglin et al., "Auto-Adjudication Process via Machine Learning," U.S. Appl. No. 19/053,942, filed Feb. 14, 2025.

Starszyk et al., "Automated Component Deployment Recommendations for Artificial Intelligence Production Pipeline Orchestration," U.S. Appl. No. 18/817,285, filed Aug. 28, 2024.

Chang et al., "Classifier Guided Cluster Density Reduction," U.S. Appl. No. 18/817,329, filed Aug. 28, 2024.

Cresswell et al., "Efficient Scaling of Artificial Intelligence Models," U.S. Appl. No. 18/934,321, filed Nov. 1, 2024.

Cresswell et al., "Scaling Artificial Intelligence Models With Gradient Boosting," U.S. Appl. No. 18/934,282, filed Nov. 1, 2024.

Gofman et al., "Recommendation Process for Retrieval-Augmented Generation (RAG) Models," U.S. Appl. No. 18/817,519, filed Aug. 28, 2024.

Meyer et al., "Automated Data Validation Recommendations to Enhance Reliability of Artificial Intelligence," U.S. Appl. No. 18/813,254, filed Aug. 23, 2024.

Meyer et al., "Enhancing Reliability of Artificial Intelligence Operational Pipelines," U.S. Appl. No. 18/813,238, filed Aug. 23, 2024.

Meyer et al., "Reducing Computation Time in Data Revalidation in Artificial Intelligence Operational Pipelines," U.S. Appl. No. 18/813,270, filed Aug. 23, 2024.

Meyer et al., "Tokenized Data Validation in Artificial Intelligence Operational Pipelines," U.S. Appl. No. 18/813,557, filed Aug. 23, 2024.

Starsyk et al., "Optimization of Processing Core Assignment for Software Using Runtime Attributes," U.S. Appl. No. 18/813,577, filed Aug. 23, 2024.

Starszyk et al., "Automated Efficiency Determination of Components Prior to Deployment to Artificial Intelligence Production Pipeline," U.S. Appl. No. 18/817,290, filed Aug. 28, 2024.

Starszyk et al., "Dynamic Determination of Host Location for Logging System of Artificial Intelligence Pipelines," U.S. Appl. No. 18/813,626, filed Aug. 23, 2024.

Starszyk et al., "Fault Tolerant Logging for Artificial Intelligence Applications," U.S. Appl. No. 18/813,641, filed Aug. 23, 2024.

Starszyk et al., "Optimizer for Processing Core Affinity," U.S. Appl. No. 18/813,594, filed Aug. 23, 2024.

Starszyk et al., "Recruitment of Software Program to Optimal Cores," U.S. Appl. No. 18/813,608, filed Aug. 23, 2024.

Thomas et al., "Context Retrieval for In-Context Learning Model," U.S. Appl. No. 18/817,408, filed Aug. 28, 2024.

Thomas et al., "Nearest Neighbor Retrieval and Fine-Tuning for In-Context Learning Model," U.S. Appl. No. 18/817,505, filed Aug. 28, 2024.

Thomas et al., "Tabular Selection Based on Dimensionality of Memory of Artificial Intelligence Model," U.S. Appl. No. 18/817,371, filed Aug. 28, 2024.

Thomas et al., "Weighted Retrieval for In-Context Tabular Model," U.S. Appl. No. 18/817,402, filed Aug. 28, 2024.

* cited by examiner

100

200B

300

400A

400B

500A

500B

500C

500D

600

610

710

800

AUTOMATED COMPONENT DEPLOYMENT RECOMMENDATIONS FOR ARTIFICIAL INTELLIGENCE PRODUCTION PIPELINE ORCHESTRATION

BACKGROUND

There can be a significant difference between technical environments and skillsets used during model development and during model deployment. This difference can result in a bottleneck to operationalizing models in a production environment. Model developers may use non-standardized processes to develop model pipelines. Even if a model developer uses a standardized framework, the data sources between a development environment and a production environment are usually different, leading to incompatibility issues. Both incongruencies make it challenging to integrate a model developer's pipeline from a development environment into a production environment. Historically such integration was achieved by building a specialized production pipeline on a use-case by use-case basis, which consumes a substantial amount of engineering efforts and time.

SUMMARY

One example embodiment provides an apparatus that includes a memory communicably coupled to a processor, wherein the processor may one or more of store utility components within memory of a software application, receive a configuration file defining component configurations, receive an artificial intelligence (AI) model which comprises at least one of source code, binary code, software end points, and configuration information, wrap the AI model into a wrapped AI model that includes an interface that provides access to the AI model, generate a production pipeline for the AI model which includes a sequence of components including the wrapped AI model and at least one utility component connected to the interface based on the component configurations included in the configuration file, and execute the production pipeline for the AI model on input data via the software application to generate an inference result.

Another example embodiment provides a method that includes one or more of storing utility components within a storage of a software application, receiving a configuration file defining component configurations, receiving an artificial intelligence (AI) model which comprises at least one of source code, binary code, software end points, and configuration information, wrapping the AI model into a wrapped AI model that includes an interface that provides access to the AI model, generating a production pipeline for the AI model which includes a sequence of components including the wrapped AI model and at least one utility component connected to the interface based on the component configurations included in the configuration file, and executing the production pipeline for the AI model on input data via the software application to generate an inference result.

A further example embodiment provides a computer readable storage medium comprising instructions, that when read by a processor, cause the processor to perform one or more of storing utility components within a storage of a software application, receiving a configuration file defining component configurations, receiving an artificial intelligence (AI) model which comprises at least one of source code, binary code, software end points, and configuration information, wrapping the AI model into a wrapped AI model that includes an interface that provides access to the AI model, generating a production pipeline for the AI model which includes a sequence of components including the wrapped AI model and at least one utility component connected to the interface based on the component configurations included in the configuration file, and executing the production pipeline for the AI model on input data via the software application to generate an inference result.

One example embodiment provides an apparatus that includes a memory communicably coupled to a processor, wherein the processor may one or more of store utility components for a production environment within the memory, receive, via a software application, an artificial intelligence (AI) model from a development environment, receive a configuration file defining a configuration of a pipeline in the production environment which includes the AI model, generate, via the software application, a production pipeline of the AI model which includes a sequence of components including the AI model and at least one utility component from the utility components based on the configuration file, determine whether the production pipeline satisfies at least one regulatory requirement based on the sequence of components, and in response to the production pipeline satisfying the at least one regulatory requirement, execute the production pipeline of the AI model on input data via the software application in the production environment.

Another example embodiment provides a method that includes one or more of storing utility components for a production environment within a storage, receiving, via a software application, an artificial intelligence (AI) model from a development environment, receiving a configuration file defining a configuration of a pipeline in the production environment which includes the AI model, generating, via the software application, a production pipeline of the AI model which includes a sequence of components including the AI model and at least one utility component from the utility components based on the configuration file, determining whether the production pipeline satisfies at least one regulatory requirement based on the sequence of components, and in response to the production pipeline satisfying the at least one regulatory requirement, executing the production pipeline of the AI model on input data via the software application in the production environment.

A further example embodiment provides a computer readable storage medium comprising instructions, that when read by a processor, cause the processor to perform one or more of storing utility components for a production environment within a storage, receiving, via a software application, an artificial intelligence (AI) model from a development environment, receiving a configuration file defining a configuration of a pipeline in the production environment which includes the AI model, generating, via the software application, a production pipeline of the AI model which includes a sequence of components including the AI model and at least one utility component from the utility components based on the configuration file, determining whether the production pipeline satisfies at least one regulatory requirement based on the sequence of components, and in response to the production pipeline satisfying the at least one regulatory requirement, executing the production pipeline of the AI model on input data via the software application in the production environment.

DETAILED DESCRIPTION

Figure 1:
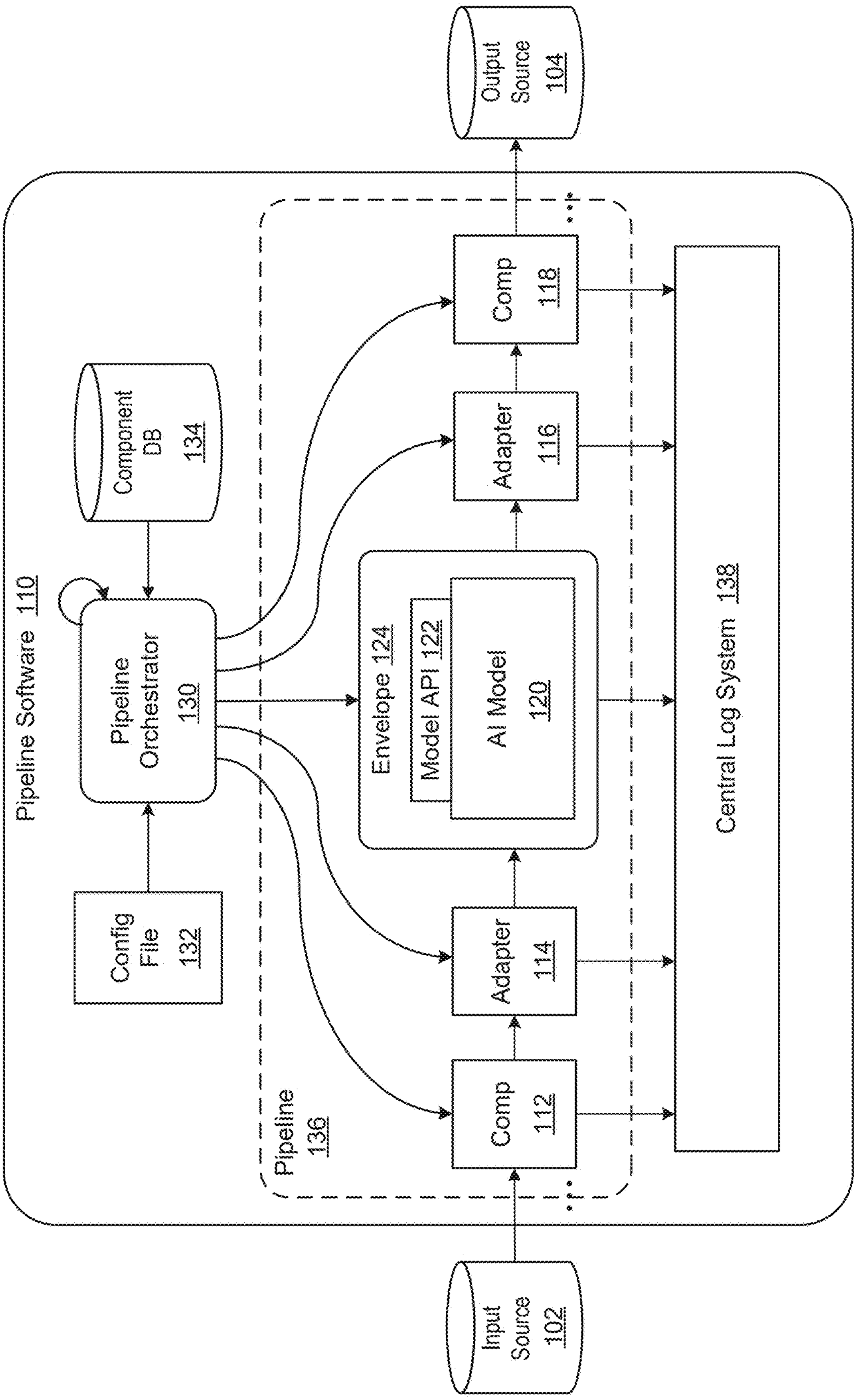
FIG. 1 is a diagram illustrating a process of deploying and configuring a production AI pipeline according to examples and features of the instant solution.

The examples and features of the instant solution are directed to a system that can automatically deploy an artificial intelligence (AI) pipeline within a production environment based on source code of an AI model from a development environment. The system may also receive a configuration file which defines the components to be used with the AI model in the production environment. Here, the system includes a repository of common utility components that can be integrated within a production pipeline without developing the utility components, thereby relieving developers from having to generate such components on their own. Furthermore, the AI model (e.g., the source code) from the development environment can be wrapped into an envelope thereby standardizing a format of the AI model. The wrapped AI model can be integrated into the production pipeline in sequence with at least one of the utility components.

The common utility components may include utilities that are commonly used to operationalize an AI pipeline such as, but not limited to, hypertext transfer protocol (HTTP) data parsers, payload flatteners, data validators, structure validators, and the like. The common utilities are often responsible for converting raw HTTP data into a format for input to the AI model. The configuration file may be generated by a developer, for example, using a development environment. The configuration file may contain identifiers of the sequence of components to be included in the production pipeline. The configuration file may also identify the inputs and the outputs of each of the components, including how the components interact with one another.

In addition, in some examples and features of the instant solution, the configuration file may include custom code which can be included in the production pipeline. Here, a developer may design their own custom component which the system can insert into an adapter module and add to the production pipeline. For example, the system may extract the custom code and wrap the custom code into an envelope that can be added to the production pipeline. The wrapped AI model and/or the wrapped custom code may include an interface, such as an application programming interface (API) which enables the other components within the production pipeline to communicate with the AI model and/or the custom code in the adapter.

In one example of the instant solution, the system stores utility components-such as HTTP parsers, data validators, and structural validators-within a cloud-based storage repository. These components are essential for preprocessing input data, validating its integrity, and ensuring it is in the correct format for the AI model.

Upon receiving an AI model from a development environment, the cloud-hosted system retrieves the relevant utility components and dynamically generates a production pipeline. This pipeline is configured according to a predefined configuration file, which specifies the sequence and dependencies of the components. The AI model is then wrapped in an envelope that includes a standardized interface, such as an API, which facilitates communication between the model and the other components within the pipeline.

The pipeline orchestrator, running on cloud infrastructure, coordinates the data flow between the input source, the AI model, and the output destination. This orchestration ensures that data is appropriately processed at each stage, from input parsing and validation to the generation of inference results by the AI model. The cloud environment enables the solution to scale the deployment across multiple instances or nodes, providing high availability and load balancing to handle large volumes of data.

Additionally, the cloud-based system includes a central logging mechanism, where log messages from all components, including the AI model, are stored. This centralized logging not only facilitates real-time monitoring and troubleshooting but also ensures compliance with regulatory requirements by enabling detailed auditing and analysis of the pipeline's operations.

The instant solution efficiently deploys and manages AI models in a production environment, ensuring high performance, reliability, and compliance while minimizing manual intervention.

In another example of the instant solution, an AI model developed in a separate environment is received, which may include source code, binary code, software endpoints, and configuration details. This model is wrapped within an envelope that standardizes its format, creating a wrapped AI model equipped with an interface (such as an API) to facilitate seamless communication with other components in the pipeline.

A configuration file, which defines the sequence and specific components to be used in the pipeline, is also received. This file offers allows developers to string together a custom pipeline of both pre-built utility components—such as HTTP parsers, payload flatteners, data validators, and structure validators—and custom components created to meet specific needs. These components are critical in transforming raw data into a format that the AI model can process in real-time.

The processor dynamically selects and arranges the components within the production pipeline based on the configuration file. The orchestrator manages this sequence, ensuring that data flows seamlessly from one component to the next. For instance, the orchestrator may place data validation and preprocessing components before the AI model, ensuring that input data is correctly formatted and validated. After the AI model processes the data, additional components may handle output interpretation and storage.

During the pipeline's execution, log messages from all components, including the wrapped AI model, are captured and stored in a central log system. This centralized logging ensures comprehensive monitoring, troubleshooting, and compliance with regulatory standards, all without requiring manual intervention or code changes. The solution includes mechanisms for continuous improvement, where feedback from the pipeline's performance is used to refine the configuration and selection of components, further optimizing the pipeline over time.

FIG. 1 illustrates a process 100 of deploying and configuring a production AI pipeline according to examples and features of the instant solution. Referring to FIG. 1, a host platform (not shown) that includes at least one processor may host pipeline software 110 which is capable of receiving an AI model, such as an AI model 120 that has been trained in a development environment and deploying a pipeline of components in sequence with the AI model. For example, the pipeline may include components that can receive input data, prepare the input data for processing by the AI model, interpret the output of the AI model, and the like. The pipeline may extend from an input data source to an output storage source.

The sequence of components may include components for processing a data flow into and out of the AI model. For example, the components may include adapters, converters, etc. for converting raw data from a data source into a format that can be input to and executed by the AI model. The components may also include components for data cleaning and preparation, feature engineering and selection, understanding, interpreting, and integrating the output results from the AI model, and the like. The decision on which components to include in a production pipeline may be performed by a pipeline orchestrator 130 of the pipeline software 110. The pipeline orchestrator 130 may be responsible for scheduling, managing, and controlling the flow and processing of data through the pipeline.

According to various examples and features of the instant solution, the pipeline orchestrator 130 may receive a configuration file 132 which defines the components included in the production pipeline including any common utility components, custom components, AI model(s), and the like. In this example, the pipeline orchestrator 130 maintains a component database 134 that may be retrieved and added to a pipeline. As an example, the component database 134 may include utility components stored therein such as HTTP data parsers, payload flatteners, data validators, structure validators, model interpretation components, and the like. The pipeline orchestrator 130 may determine which common utility components to add to a production pipeline and where to include the common utility components within the sequence based on the configuration file 132.

In the example of FIG. 1, the pipeline orchestrator 130 receives the configuration file 132 and generates a production pipeline 136 based on instructions stored within the configuration file 132. Here, the production pipeline 136 includes an AI model 120 that is trained to receive input data and generate a predicted output such as an inference using the input data. According to various examples and features of the instant solution, the pipeline orchestrator 130 may wrap the AI model 120 using an envelope 124 and add an interface (e.g., model API 122) for communicating with the AI model 120. The AI model 120 which has been wrapped may be added to the production pipeline 136 at a position within the sequence of components based on the instructions in the configuration file 132.

The pipeline orchestrator 130 may also add at least one component before the AI model 120 within the sequence of components in the production pipeline 136 and add at least one component after the AI model 120 within the production pipeline 136. For example, the pipeline orchestrator 130 may add a component 112 and an adapter 114 to the sequence of components prior to the AI model 120. The component 112 may be a common component selected from the component database 134 such as an HTTP data parser that is configured to receive input data from an input source 102 and parse the input data. The adapter 114 may include functionality for converting the parsed input data into a format that is capable of execution by the AI model 120.

The pipeline orchestrator 130 may also add at least one component after the AI model 120 within the sequence of components in the production pipeline 136. Here, the pipeline orchestrator 130 may add an adapter 116 and a component 118 downstream from the AI model 120 which are capable of converting an output from the AI model 120 into a format that can be stored within an output source 104. In some examples and features of the instant solution, the adapter 114 and the adapter 116 may include a common utility from the component database 134. As another example, the adapter 114 and the adapter 116 may include custom code created by a developer.

According to various examples and features of the instant solution, the pipeline orchestrator 130 may also manage a central log system 138 for the production pipeline 136. The components 112 and 118 may include predefined code modules that cause the components 112 and 118 to store log messages generated by the components 112 and 118 into the central log system 138. Furthermore, the adapters 114 and 116 may include standard code which causes the adapters 114 and 116 to store log messages generated by the adapters 114 and 116 into the central log system 138. Furthermore, the envelope 124 used to wrap the AI model 120 may include code that ensures the log messages generated by the AI model 120 are stored in the central log system 138. For example, the envelope 124 may replace or otherwise intercept calls to a log system and inject an optional adapter object that mimics the logger inside the developer pipeline such that when a logging call is present, it routes all the log messages to the central log system 138 (e.g., an endpoint of the central log system 138).

The production pipeline 136 may be executed on input data from the input source 102 to generate an inference result that is output and stored within the output source 104. The entire deployment process may be automated. The wrapping process performed by the pipeline orchestrator 130 may wrap the source code with a new data structure that includes an interface (e.g., an API) that is in a standardized format and which enables the AI model 120 to communicate with the other components in the pipeline such as the common utility components. The common utility components include common utilities to operationalize machine learning (ML) pipelines over web servers. These utilities make it possible to convert raw HTTP data into a format for model input in real-time.

The configuration file offers high flexibility for a developer to configure a custom pipeline of the components by specifying them in the configuration file. Adapter modules offer further flexibility by enabling the developer to write custom components and insert them into a pipeline via the configuration file. An integrated messaging solution causes all of the components, the adapters, and the wrapped AI model(s) to store logs messages in a central logging system within the model pipeline without requiring any code changes to the model pipeline.

Some of the benefits of the orchestrator include wrapping the model code into a production ready pipeline with error handling/logging which typically requires work from an engineer. The framework offers a catalogue of common utility components all in one place that can be orchestrated easily/quickly into a pipeline that has production grade features built in, thereby reducing the overall time to deliver for a use case.

According to various examples and features of the instant solution, a developer may provide an AI model, for example, source code of the AI model to the pipeline software. The orchestrator may wrap the AI model, regardless of programming language, with a common utility package to create an executable package that is agnostic to programming languages, platforms, and the like. Furthermore, the developer may also provide a configuration file that defines a pipeline for the AI model, including components that are used before the AI model and after the AI model. The pipeline may be configured to read data from an input data source, convert the data in some manner, input the data to the AI model, interpret the output of the AI model, convert the output to another format, and store the output in an output data source. The orchestrator can use pre-built utility components (predefined code modules) without a developer to provide such modules.

The pre-built components are already tested and proven to work within the pipeline software and with wrapped AI models. Therefore, in doing so, the system can ensure that the utility components do not prevent system downtime because they are ensured to work. The orchestrator can read the configuration file, identify the components, and auto-append the components to the pipeline. As another example, the orchestrator may not receive a configuration file, but may instead, automatically recommend the components based on a type of model, model parameters, model inputs, model outputs, and the like.

The automation process can be used to deploy many instances of the pipeline. Furthermore, various industries enforce strict regulation on model bias, input data, data scrubbing, and the like. The examples and features of the instant solution may also implement a validation module that can verify that the input data satisfies one or more regulatory requirements such as age (regression), privacy requirements, organizational compliance, and the like. In addition, the validation module may verify that the AI model is not biased. Here the validation module may analyze the data used to train the model, perform a review of the algorithm, evaluate the outcome, receive feedback from users, and the like, and determine whether the AI model is biased. As another example, the validation module may perform tests on the AI model such as permutation testing, adversarial testing, or the like, to discover if bias exists or not.

Figure 2A:
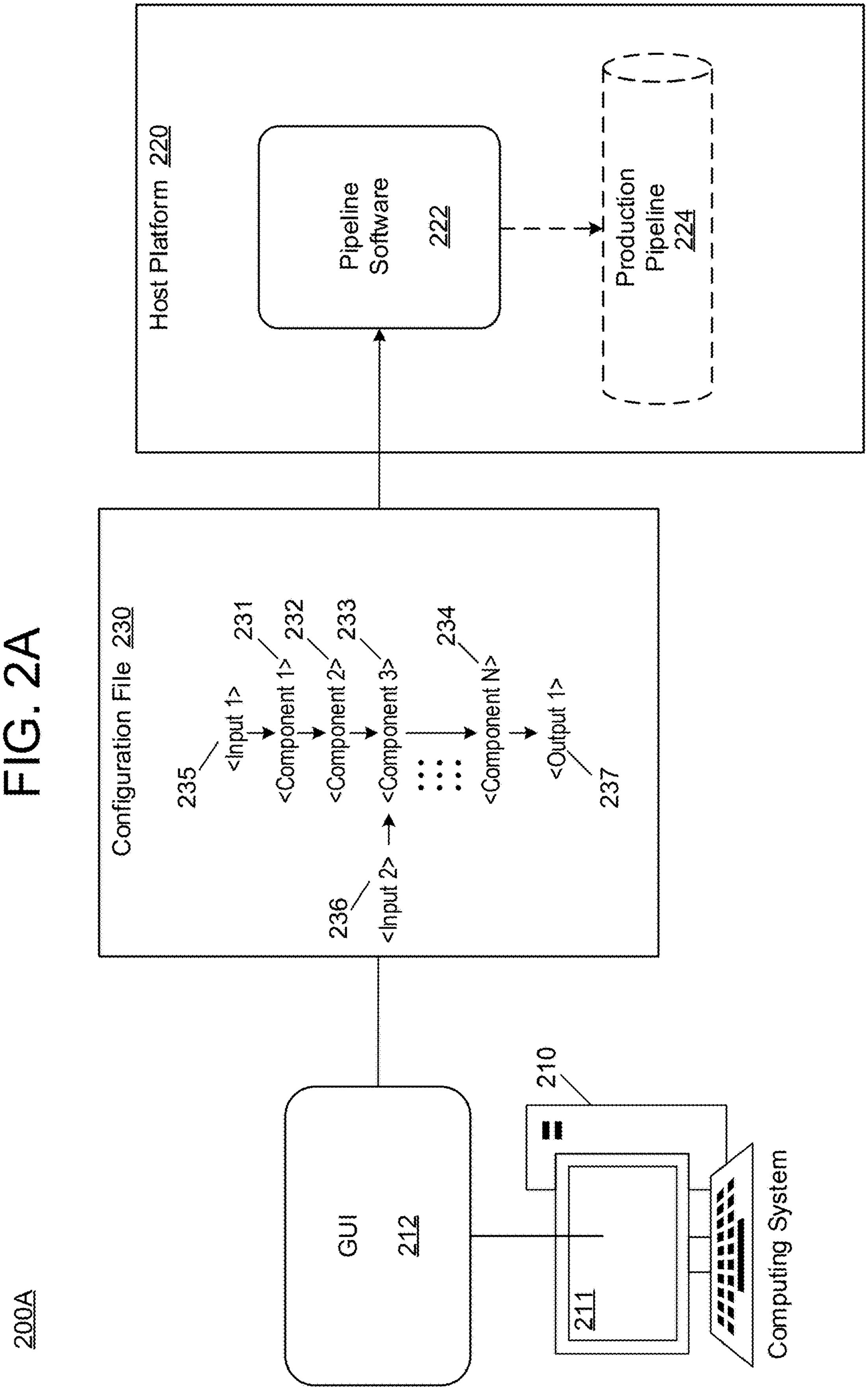
FIGS. 2A-2B are diagrams illustrating a process of modifying processing cores assigned to a software application by default according to the examples and features of the instant solution.
Figure 2B:
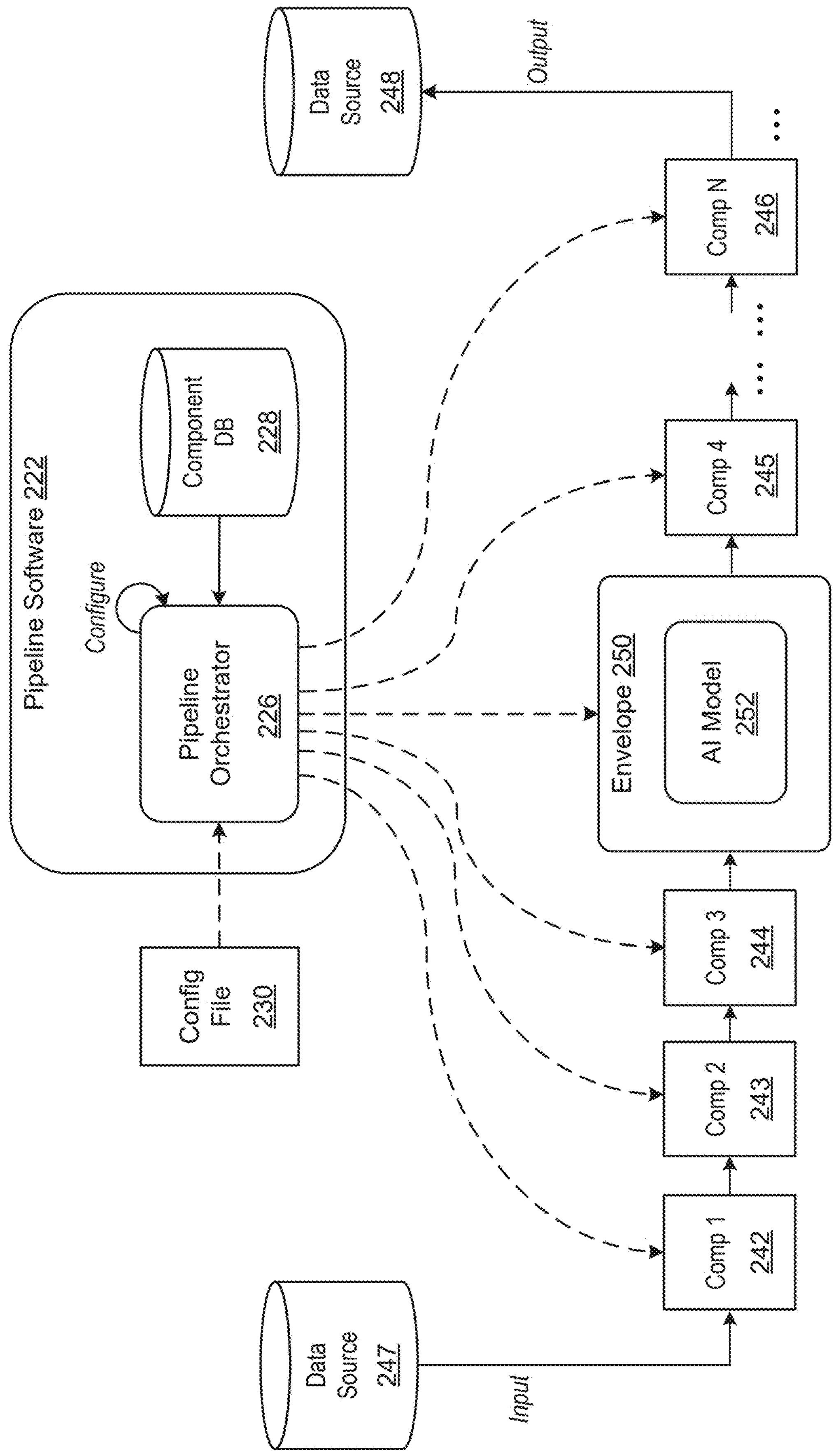

FIGS. 2A-2B illustrate a process of modifying processing cores assigned to a software application by default according to the examples and features of the instant solution. For example, FIG. 2A illustrates a process 200A of a configuration file 230 being generated according to examples and features of the instant solution. Referring to FIG. 2A, in this example, a user such as a model developer may use a computing device 210 to connect to a pipeline software 222 hosted by a host platform 220. Here, the host platform 220 may include a cloud platform, a web server, a combination of systems, and the like. The computing device 210 may connect to the host platform 220 over a computer network such as the Internet. Here, the computing device 210 may access the pipeline software 222 via a browser installed on the computing device 210 (e.g., using an IP address of the pipeline software 222). As another example, the computing device 210 may install the pipeline software 222 locally and access it through a local runtime environment of the computing device 210.

In this example, a user may enter commands into a graphical user interface (GUI) 212 of the computing device 210 (such as a GUI of the pipeline software 222) which is displayed on a display screen 211 of the computing device 210. Here, the user may enter commands into the GUI 212 based on commands through a keyboard, mouse, touch screen, etc. to generate a configuration file 230 that specifies an AI model to be included in a pipeline, one or more components to be included in the pipeline with the AI model, such as common utility components, custom components, and the like, an order of the components such as a sequence, in parallel, etc., an input source, an output source, and the like.

In FIG. 2A, the configuration file 230 includes a first component 231, a second component 232, a third component 233, and an Nth component 234 that are ordered/arranged with respect to each other. In addition, the configuration file 230 also includes a first input 235, a second input 236, and an output 237. It should be appreciated that the configuration file 230 may be implemented in many different manners. For example, the configuration file 230 may be a file in a common markup language or object notation, or the like.

In response to receiving a command from the computing device 210 to launch an AI pipeline based on the configuration file 230, the pipeline software 222 may build a production pipeline 224 in a production environment of the host platform 220. The production pipeline 224 may include the components specified by the configuration file 230, in an order specified by the configuration file 230. Here, the pipeline software 222 may connect outputs of components to inputs of other components to build a sequence of components within the production pipeline 224.

FIG. 2B illustrates a process 200B of generating a production pipeline via a pipeline orchestrator 226 of the pipeline software 222 according to examples and features of the instant solution. Referring to FIG. 2B, the pipeline orchestrator 226 may receive the configuration file 230 and automatically deploy a production pipeline which includes an AI model 252 and a plurality of components arranged in sequence with the AI model 252.

According to various examples and features of the instant solution, the pipeline orchestrator 226 may wrap the AI model 252 in an envelope 250 which may include additional functionality and features that are encapsulated and accessible via an interface such as an API. The pipeline orchestrator 226 may also arrange components 242, 243, and 244 at a position within the production pipeline that is upstream from the AI model 252, with respect to the flow of data through the production pipeline. Here, the pipeline orchestrator 226 may retrieve the components 242, 243, and 244 from a component database 228 that is embedded within the pipeline software 222.

For example, the components 242, 243, and 244 may include parsers, converters, scrubbers, feature engineering, tokenizers, vectorizers, embedders, and the like, that can be performed on input data prior to the input data being input to the AI model 252. In addition, the pipeline orchestrator 226 may establish a connection between an input data source

247 and the component 242. Here, the component 242 may be configured to retrieve the input data from the input data source 247 based on a location, file path, etc. of the data within the input data source 247.

In addition, the pipeline orchestrator 226 may also arrange components 245 and 246 within the production pipeline at a location that is downstream from the AI model 252, with respect to the flow of data from the input to the output. Here, the components 245 and 246 may perform conversions on the output data, modifications on the output data, additional interpretations on the output data, displaying of the output data, formatting of the output data for storage, and the like. In addition, the pipeline orchestrator 226 may establish a connection between the component 246 and a storage location of the output within an output data source 248. Here, the component 246 may be configured to store the output data at a particular location, file path, etc. within the output data source 248.

Figure 3:
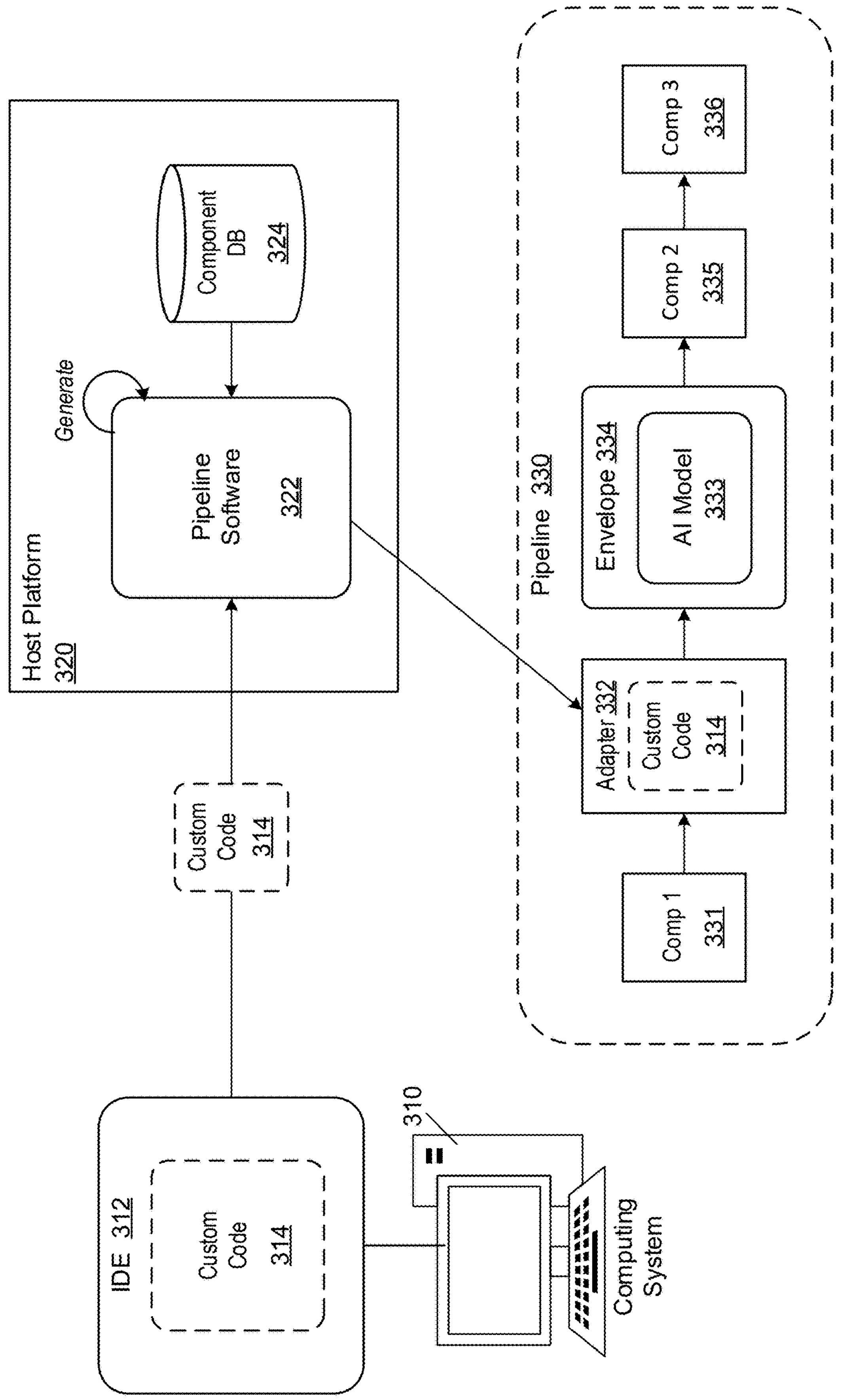
FIG. 3 is a diagram illustrating a process of integrating a custom component into a production pipeline according to examples and features of the instant solution.

FIG. 3 illustrates a process 300 of integrating a custom component into a production pipeline for an AI model according to examples and features of the instant solution. Referring to FIG. 3, a computing system 310 may access an integrated development environment (IDE) 312 that is hosted by a host platform 320. In this example, the host platform 320 may also host pipeline software 322. The computing system 310 may connect to the IDE 312 over a network, such as the Internet. The computing system 310 may also send commands to the pipeline software 322 via the IDE 312 or via a separate window provided by the host platform 320.

In this example, the computing system 310 may be used to develop a custom component for an AI model, such as a custom data converter, a custom API, a custom data scrubber, a custom model output interpreter, and the like. Here, the computing system 310 may generate custom code 314 (custom source code) for the custom component which defines the functionality of the custom component. The custom code 314 may be generated in a programming language via the IDE 312. Furthermore, the custom code 314 may be compiled, executed, etc. in the IDE 312. The custom code 314 may be integrated into a custom component of an AI pipeline.

In this example, the pipeline software 322 receives an identifier of an AI model 333 and generates a production pipeline 330 for the AI model 333. Here, the production pipeline 330 includes a wrapped version of the AI model 333 that is generated by enclosing the AI model 333 in an envelope 334 or some other wrapper. The envelope 334 may provide an interface that enables the AI model 333 to communicate with pre-built components stored within a component database 324. This process may be performed by a pipeline orchestrator (not shown). In addition, the pipeline orchestrator may also integrate one or more common utility components into the production pipeline 330 including component 331, component 335, and component 336. The components 331, 335, and 336 may include pre-developed code that is tested to work and which is stored within and retrieved from the component database 324 of the pipeline software 322.

Furthermore, the pipeline software 322 may also generate a custom adapter 332 which includes the custom code 314 wrapped with a similar envelope as the AI model 333 including a similar interface which enables the custom adapter 332 to communicate with other components in the production pipeline 330 and the AI model 333. Here, the custom adapter 332 is integrated upstream from the AI model 333 in the flow of data within the production pipeline 330 and is connected directly to the AI model 333 such as that an output of the custom adapter 332 is input to the AI model 333 via an API of the envelope 334. The production pipeline 330 may be executed with the custom adapter 332 communicating seamlessly with the components 331, 335, and 336, and the AI model 333.

In the examples and features of the instant solution, the AI model may be developed in a development environment with different storage locations, logging calls, and the like. In the examples and features of the instant solution, the orchestrator may configure the AI model to store log messages within a central log system of a pipeline in a production environment.

Figure 4A:
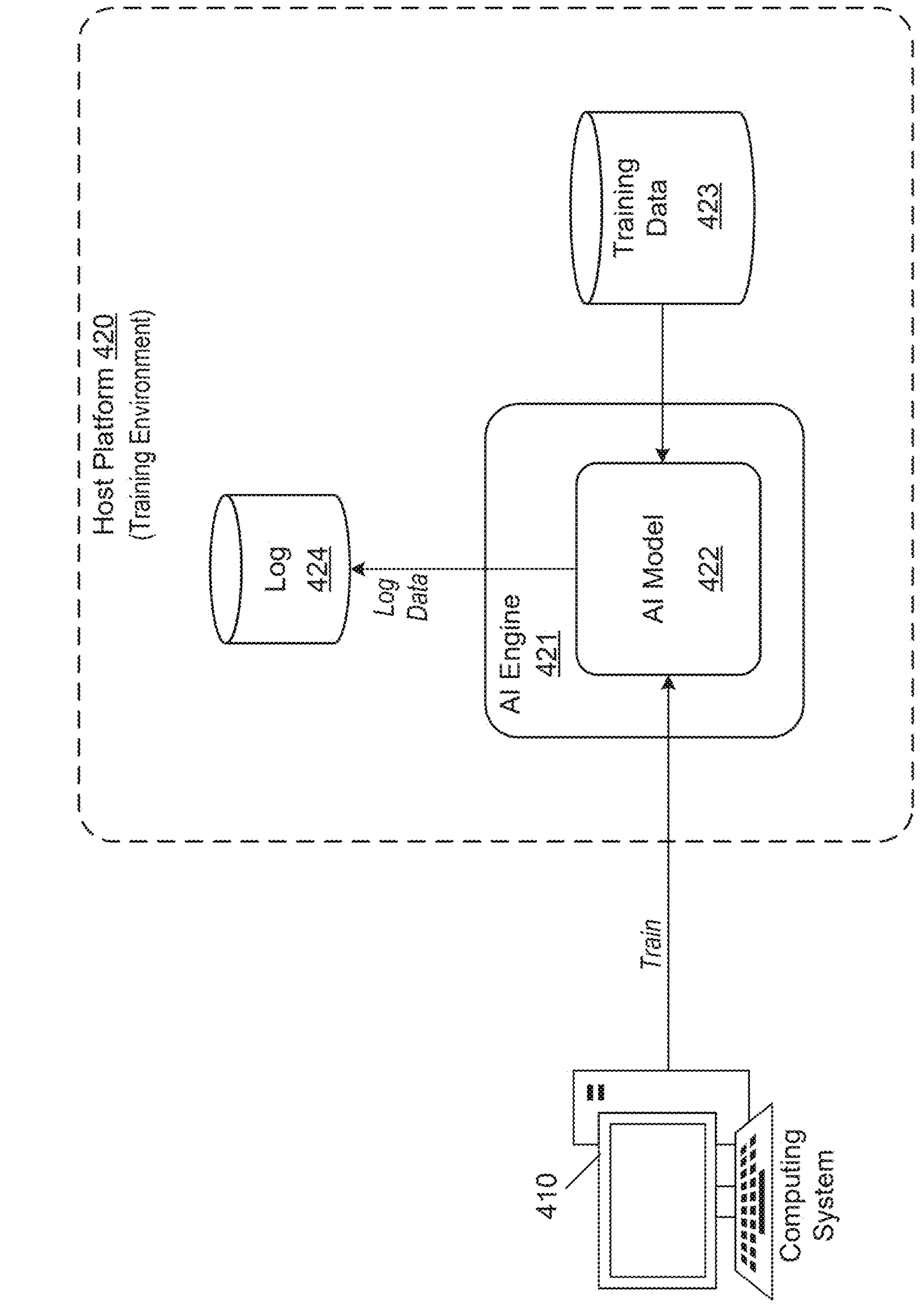
FIG. 4A is a diagram illustrating a process of training an AI model in a development environment according to examples and features of the instant solution.

FIG. 4A illustrates a process 400A of training an AI model in a development environment (also referred to as training environment) according to examples and features of the instant solution. Referring to FIG. 4A, a computing system 410 may use an integrated development environment or other type of model building software to build and train an AI model 422 via a host platform 420. In this example, the computing system 410 may command epochs of training on the AI model 422 using new sets of training data from a training data database 423. Here, the computing system 410 may receive commands from a user and submit the commands to an AI engine 421 which executes the AI model 422. The AI engine 421 may retrieve training data/testing data from the training data database 423 and execute the AI model 422 on the training data to further train the AI model for a particular task.

In the development environment, the AI model 422 may be configured to send log messages to a log database 424 that is stored within the development environment. The call functions to the log database 424 may be coded into code modules within source code of the AI model 422. When the AI model 422 is fully trained, the computing system 410 may request the AI model 422 to be deployed in a production environment as shown and described with respect to FIG. 4B. For example, the user may enter a command via a GUI of the computing system 410 which instructs the host platform 420 to deploy the AI model 422 in a production environment of the host platform 420.

Figure 4B:
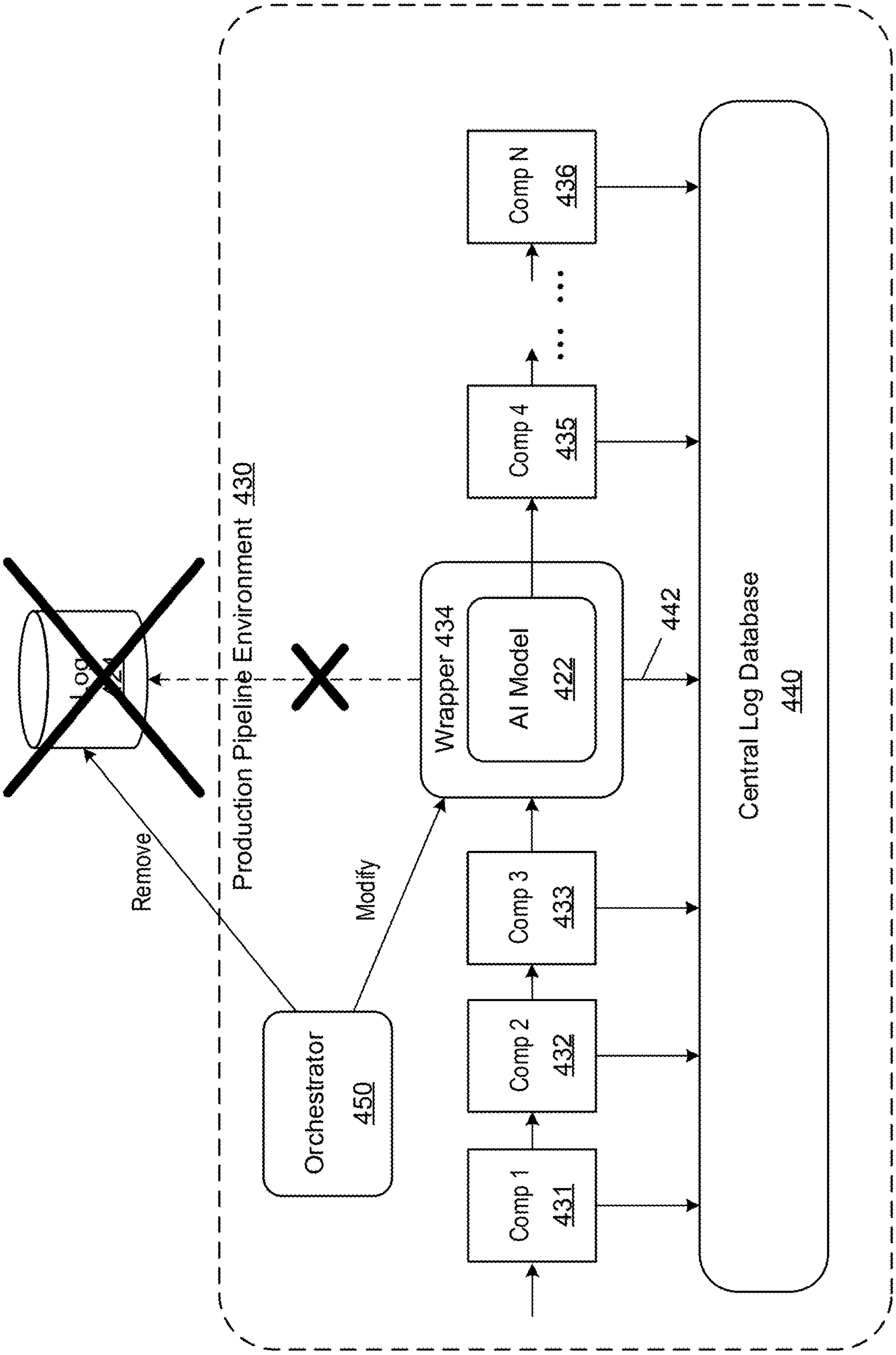
FIG. 4B is a diagram illustrating a process of modifying logging endpoints of the AI model in a production environment according to examples and features of the instant solution.

FIG. 4B illustrates a process 400B of modifying logging endpoints of the AI model 422 in a production environment according to examples and features of the instant solution. Referring to FIG. 4B, the AI model 422 may be transferred from the training environment to a production environment through an orchestrator 450 of a production pipeline environment 430 within the production environment. Here, the orchestrator 450 may wrap the AI model 422 with a wrapper 434 (additional code) that gets combined with the source code of the AI model 422 and modifies functionality therein. For example, the wrapper may include functions that intercept call functions within the AI model 422 (which are pointed toward the log database 424 in the development environment) and replace them with logging calls to a central log database 440 within the production environment.

In this example, the orchestrator 450 removes the calls from the AI model 422 to the log database 424 in the training environment by wrapping the AI model 422 with the wrapper 434 which directs calls to the central log database 440. Here, the wrapper 434 may include a predefined code module which causes the AI model 422 to send logging messages to the central log database 440 instead of the log database 424. For example, the wrapper 434 may include a code object that mimics the logger inside the developer's pipeline such that when a logging call is present, it routes all the log messages from the AI model 422 along a route 442 to the central log database 440.

Furthermore, the orchestrator 450 may build the rest of the pipeline which in this example includes components 431, 432, and 433 that are upstream from the AI model 422, and components 435 and 436 that are downstream from the AI model 422. Here, the orchestrator may determine a sequence of the components and the AI model 422 based on a configuration file. As another example, the orchestrator 450 may automatically determine the sequence of components based on a type of the AI model 422, parameters of the AI model 422, an input source of data for the AI model 422, an output storage source of the AI model 422, and the like. In some examples and features of the instant solution, one or more the components 431, 432, 433, 435, and 436 may include custom code that is provided by a developer and adapted for the pipeline.

Each of the components 431, 432, 433, 435 and 436 may include predefined code objects (similar to the wrapper 434) which route logging messages to the central log database 440 in the production environment. Thus, during execution, each of the components 431, 432, 433, 435, and 436, and the AI model 422 may direct logging message to the same/shared logging system (central log database 440).

Figure 5A:
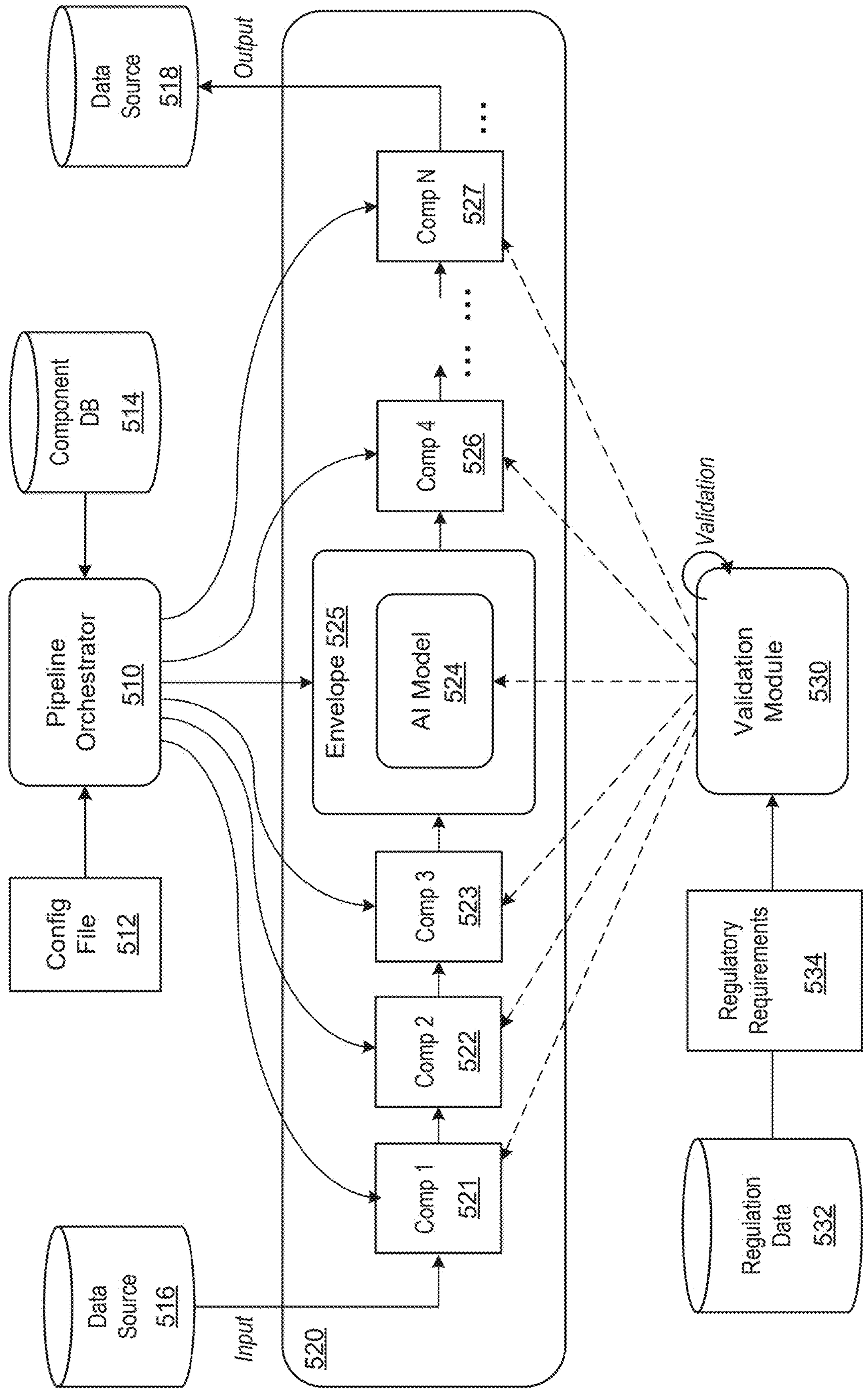
FIGS. 5A-5D are diagrams illustrating a process of validating an AI pipeline in a production environment according to examples and features of the instant solution.

FIGS. 5A-5D illustrate a process of validating an AI pipeline in a production environment according to examples and features of the instant solution. For example, FIG. 5A illustrates a process 500A of validating components of a production pipeline 520 of an AI model 524 in a production environment which includes the AI model 524 in sequence with other components according to examples and features of the instant solution. Referring to FIG. 5A, a pipeline orchestrator 510 may manage the production pipeline 520. The pipeline orchestrator 510 may be integrated within a pipeline software application running on a host platform (not shown) which includes at least one processor. Here, the host platform may be a cloud platform, a web server, or the like.

Here, the pipeline orchestrator 510 may deploy the production pipeline 520 including the AI model 524 based on configuration data in a configuration file 512 and common utility components which have been pre-designed and which are stored within a component database 514. In this example, the pipeline orchestrator 510 may wrap the AI model 524 with an envelope 525. The envelope 525 includes an interface such as an API which enables the AI model 524 to send and receive communications among the other components within the pipeline using predefined message formats.

In the example of FIG. 5A, the production pipeline 520 includes a component 521, a component 522, and a component 523 arranged in sequence and prior to (i.e., upstream in the data flow from) the AI model 524. Here, the pipeline orchestrator 510 configures the component 521 to retrieve input data from an input data source 516. In addition, the production pipeline 520 includes a component 526 and a component 527 arranged in sequence after (i.e., downstream in the data flow) the AI model 524 within the pipeline. In this example, the pipeline orchestrator 510 configures the component 527 to store the data output from the production pipeline 520 within an output storage data source 518.

In some examples and features of the instant solution, the production pipeline 520 may operate on data that includes regulatory requirements, compliance requirements, and the like. As an example, the data may include financial data, profit and loss data, and the like, which is subjected to government oversight. As another example, the AI model 524 may be trained to execute on data that is financial in nature. Thus, the AI model 524 may also be subjected to regulatory requirements. Also, the components within the production pipeline 520 may also be subjected to regulatory requirements.

According to various examples and features of the instant solution, the pipeline software may also include a validation module 530 that is capable of retrieving regulatory requirements 534 of one or more of the input data, the input data source, the AI model, the components, the output data source, and the like, from a regulation data database 532 and may validate the one or more of the input data, the input data source, the AI model, the components, the output data source, and the like, based on the regulatory requirements 534, thereby validating the production pipeline 520. As an example, the regulatory requirements 534 may enforce certain steps are taken on the input data (e.g., regression, ageing, data scrubbing, cleaning, and the like). As another example, the regulatory requirements 534 may enforce that the AI model exhibits no bias or bias below a threshold. As another example, the regulatory requirements 534 may enforce certain outputs to be generated, such as for purposes of explainability.

Figure 5B:
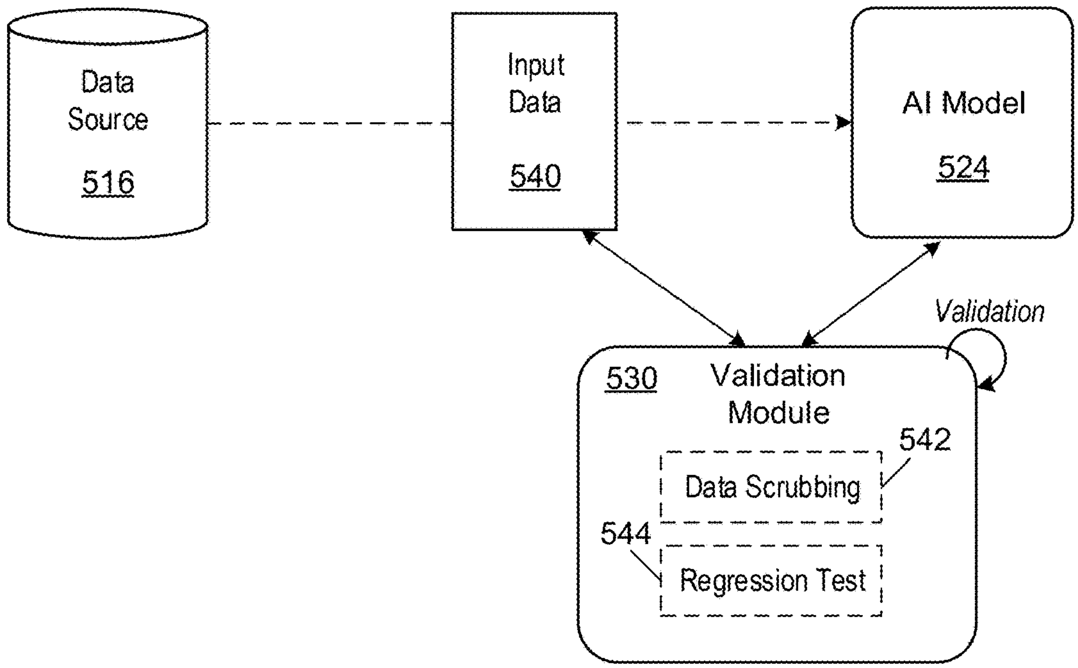

FIG. 5B illustrates a process 500B of the validation module 530 validating input data 540 provided by an input data source 516, such as a web-based data store, a local data store, an external website, or the like, according to examples and features of the instant solution. Referring to FIG. 5B, the validation module 530 performs a data scrubbing 542 validation process to verify that one or more data scrubbing steps are performed by one or more components in the production pipeline 520 on the input data 540 based on the regulatory requirements 534. For example, the validation module 530 may receive the input data 540 from one of the input data source 516, the component 521, the component 522, and the component 523 which are upstream from the AI model 524, and verify that the data scrubbing has been performed prior to input to the AI model 524.

As an example, the data scrubbing may enforce that errors are removed, duplicated data be deleted, the input data 540 is in a proper format, and the like. As another example, the data scrubbing may enforce that personally identifiable information (PII) be deleted/removed from the input data 540. If the data scrubbing 542 validation is successful, the input data 540 may be validated.

As another example, the validation module 530 may perform a regression test 544 process to verify that data older than a particular period of time is not included in the input data 540 based on the regulatory requirements 534. For example, the validation module 530 may receive the input data 540 from one of the input data source 516, the component 521, the component 522, and the component 523 and determine whether no data older than a certain timestamp is present within the input data 540. If the regression test 544 is successful, the input data 540 may be validated.

Figure 5C:
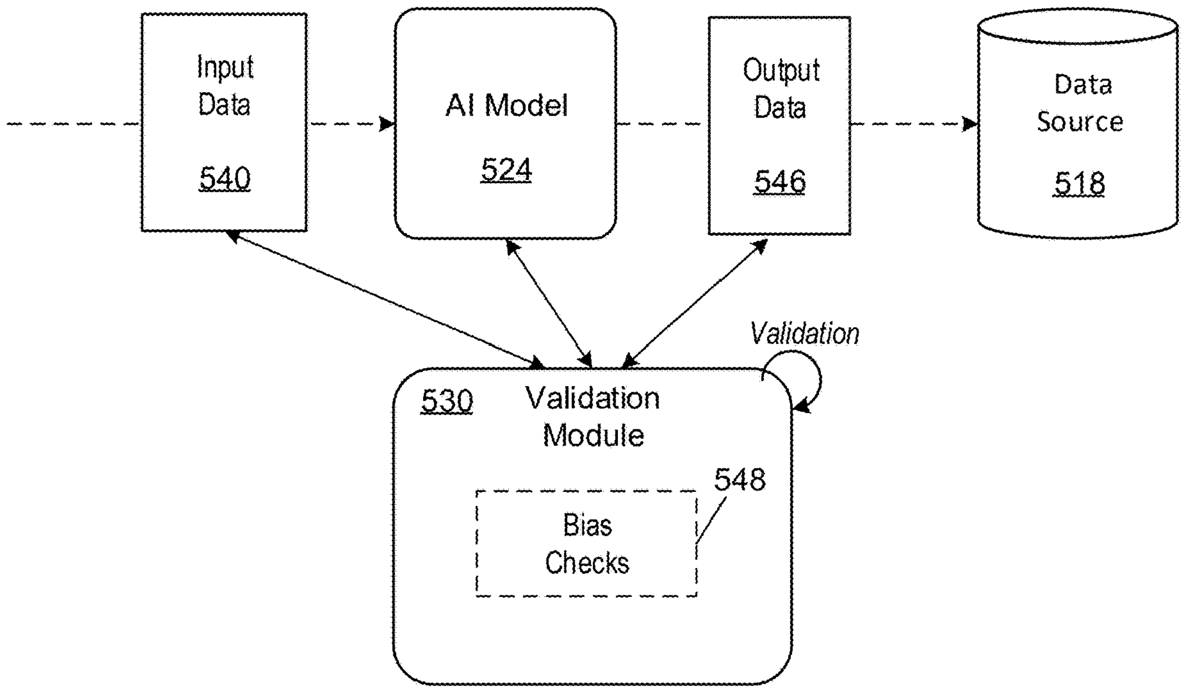

FIG. 5C illustrates a process 500C of the validation module 530 validating the AI model 524 for bias based on at least one of the input data 540, the AI model 524 (e.g., the source code, the algorithm, etc.), and output data 546 generated by the AI model 524 according to examples and features of the instant solution. In this example, the validation module 530 may determine whether or not the AI model 524 exhibits bias in its outputs within the output data 546 via a bias checks 548 process.

In some examples and features of the instant solution, the bias checks 548 process may not be a one-time task, but rather an ongoing process that fits into an AI feedback loop of the production pipeline 520. Some of the ways the validation module 530 may check for bias include, but are not limited to, examining historical data for patterns of inequality. For example, if loan data shows higher rejection rates for a minority group, this may indicate bias.

As another example, the validation module 530 may examine the model's decision-making process to see if it weighs certain demographic features too heavily. As another example, the validation module 530 may regularly assess the model's decisions to see if certain groups are disadvantaged. As another example, the validation module 530 may compare the model's predictions with the actual or expected outcomes to quantify the model's accuracy, precision, recall, or fairness.

Figure 5D:
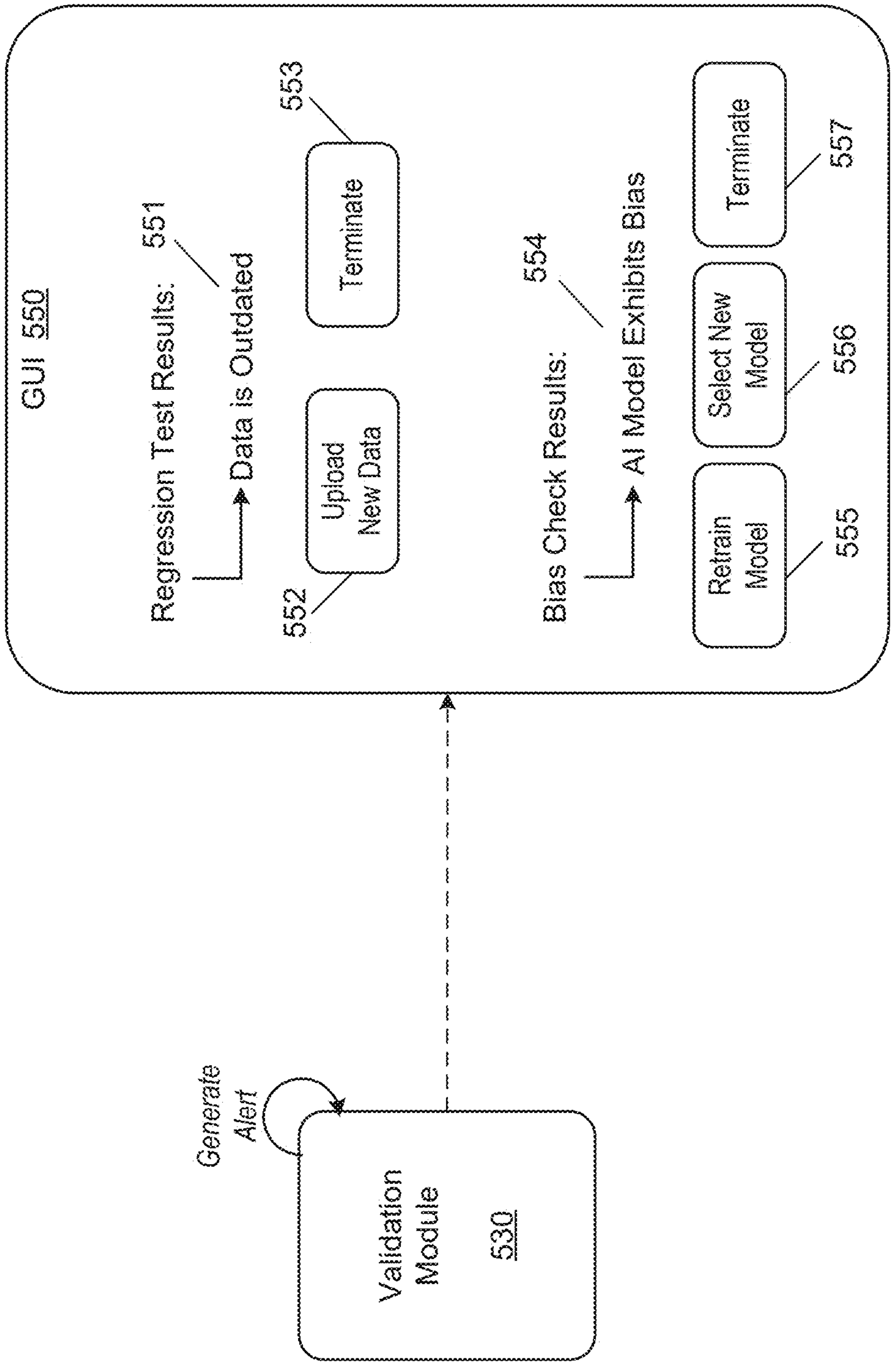

FIG. 5D illustrates a process 500D of the validation module 530 outputting results of the validation process via a GUI 550 of the pipeline software according to examples and features of the instant solution. Referring to FIG. 5D, the validation module 530 may generate results of the regression test 551 and display them on the GUI. Here, the results of the regression test 551 indicate that the data is outdated. In this case, the validation module 530 may dynamically populate the GUI 550 with one or more GUI elements including GUI element 552 and GUI element 553 which are capable of receiving user commands. For example, the GUI element 552 may receive a user input and trigger new data to be uploaded or enable the user to search for a location of the new data to be uploaded. As another example, the GUI element 553 may receive a user input and terminate the process.

In addition, the validation module 530 may dynamically populate the GUI 550 with results of the bias checking 554 which is performed on the AI model. Here the results of the bias checking 554 indicate that the AI model exhibits bias. In this case, the validation module 530 may dynamically populate the GUI 550 with a GUI element 555, a GUI element 556, and a GUI element 557. For example, the GUI element 555 may receive a user input and navigate to a retraining page of an IDE or other development environment of the AI model. As another example, the GUI element 556 may receive a user input and in response select a new model or open a browsable window which allows a new model to be searched for and selected from existing models. As another example, the GUI element 557 may be selected and in response, the software may terminate the process.

The instant solution automates the deployment of AI model production pipelines, addressing the significant differences between technical environments and skill sets used during model development and deployment. The solution includes a memory communicably coupled to a processor. The processor is configured to store utility components within the storage of a software application. These utility components are used in operationalizing an AI pipeline in a production environment. Examples of utility components stored in the solution include HTTP data parsers, payload flatteners, data validators, and structure validators, which facilitate converting raw HTTP data into the format for input to the AI model. The solution also receives a configuration file that defines the component configurations. The configuration file may be generated by a developer in a development environment and includes identifiers of the sequence of components to be integrated into the production pipeline. It also specifies the inputs and outputs of each component and details how these components interact with one another.

Upon receiving an AI model, which can comprise source code, binary code, software endpoints, and configuration information, the processor wraps the AI model into a wrapped AI model. The wrapping process generates an interface, such as an API, that provides standardized access to the AI model. The wrapped AI model facilitates communication with other components within the production pipeline. The processor generates a production pipeline for the AI model, including a sequence of components, such as the wrapped AI model and at least one utility component connected to the interface. The sequence and configuration of these components are based on the specifications provided in the configuration file. The production pipeline might include components for data input preparation, feature engineering, output interpretation, and storage. For instance, in a typical setup, the orchestrator component of the pipeline software will insert utility components such as HTTP data parsers and data validators before the wrapped AI model in the sequence, ensuring that input data is properly formatted and validated before being processed by the AI model. Similarly, utility components for output data conversion and storage are inserted after the AI model to ensure the output is correctly handled and stored. The production pipeline, once configured, is executed by the processor on input data via the software application to generate inference results. Execution involves coordinating the data flow through the sequence of components, ensuring that each component performs its designated function, from data ingestion and preprocessing to inference generation and output storage. The solution may include a central logging mechanism where all components, including the wrapped AI model, store log messages, ensuring that all logs are collected in a central location, facilitating monitoring and troubleshooting without requiring any code changes to the model pipeline.

The instant solution is configured to manage and deploy utility components in a specified sequence within the production pipeline. The solution receives a configuration file that defines the component configurations. The configuration file specifies the components to be used, their order, and how they interact within the production pipeline. Upon receiving an AI model comprising elements such as source code, binary code, software endpoints, and configuration information, the processor wraps the AI model into a wrapped AI model. The wrapping creates an interface, such as an API, that provides standardized access to the AI model. The wrapped AI model is designed to communicate with other components within the production pipeline. The processor generates a production pipeline for the AI model. The production pipeline includes a sequence of components, with the wrapped AI model integrated among these components. The configuration file dictates the sequence and configuration of these components. An aspect of the solution is inserting at least one utility component in sequence with the wrapped AI model. These utility components can include HTTP parsers, payload flatteners, data validators, and structural validators, all for preparing and processing input data before it reaches the AI model.

The orchestrator component of the pipeline software is responsible for arranging these utility components in the correct sequence as specified in the configuration file. For example, the orchestrator may insert a set of utility components before the wrapped AI model to handle data parsing, validation, and preparation tasks. The components ensure that the input data is in the correct format and validated before being processed by the AI model. After the AI model, another set of utility components may be inserted to interpret the output, data conversion, and storage. The solution coordinates the output of each utility component to ensure it is correctly input to the interface of the wrapped AI model based on the instructions provided in the configuration file and ensures that data flows seamlessly through the sequence of components. The production pipeline, once configured, is executed by the processor on input data via the software application to generate inference results.

The instant solution is configured to manage and deploy various utility components within a production pipeline. The solution stores utility components within the storage of a software application. These utility components are for preparing and processing data, ensuring integration and operation within the production pipeline. The processor receives a configuration file that defines the component configurations and specifies the sequence and types of components used in the production pipeline, including the AI model and utility components. Upon receiving an AI model, which includes source code, binary code, software endpoints, and configuration information, the processor wraps the AI model into a wrapped AI model. The processor generates the production pipeline, incorporating a sequence of components that includes the wrapped AI model and at least one utility component connected to the interface, such as HTTP parsers, payload flatteners, data validators, and structural validators. These components are used in converting raw HTTP data into the expected format for input to the AI model, validating data integrity, and ensuring structural correctness. For example, the orchestrator component of the pipeline software inserts utility components such as HTTP parsers and data validators in the sequence before the AI model. The HTTP parser processes and converts raw HTTP input data into a structured format that the AI model can understand. The data validator then checks the parsed data for correctness, ensuring that valid data is input to the AI model. After the AI model processes the data, additional utility components like structural validators ensure the output data meets the structural standards before it is stored or used further. The orchestrator also coordinates the output of each utility component to ensure it is correctly inputted to the interface of the wrapped AI model based on the instructions provided in the configuration file. This coordination ensures a smooth and efficient data flow through the sequence of components in the production pipeline. Once the production pipeline is configured, the processor executes it on input data via the software application to generate inference results.

The instant solution is configured to receive an AI model, which includes source code, binary code, software endpoints, and configuration information. The processor wraps the AI model into a wrapped AI model. The wrapped AI model can communicate with other components within the production pipeline. The processor generates a production pipeline for the AI model, which includes a sequence of components, with the wrapped AI model integrated among them. The processor inserts a first set of utility components before the wrapped AI model in the sequence and a second set after the wrapped AI model. This arrangement ensures that the input data is properly prepared and validated before reaching the AI model and that the output data is correctly processed and stored after being processed by the AI model. For instance, the orchestrator component of the pipeline software plays a role in this process. The orchestrator retrieves utility components from the storage and arranges them in the sequence specified by the configuration file. The first set of utility components might include HTTP parsers, data validators, and payload flatteners, which preprocess and validate the input data. These components ensure that the data is in the correct format and meets the validation criteria before it is input into the wrapped AI model. After the AI model processes the data, the second set of utility components may be utilized. This set may include structural validators, data converters, and other components that further process the output data, ensuring it meets the standards and formats for storage or further use. For example, a structural validator can check the structural integrity of the output data. At the same time, a data converter can transform the data into a format suitable for storage in a specific database or for further analysis. The orchestrator coordinates the output of each utility component, ensuring that it is correctly input to the interface of the wrapped AI model and subsequently processed by the downstream components. This coordination is based on the instructions provided in the configuration file, ensuring a smooth and efficient data flow through the entire production pipeline.

The instant solution is configured to generate a production pipeline for the AI model, incorporating a sequence of components that includes the wrapped AI model and at least one utility component connected to the interface. The sequence and configuration of these components are based on the specifications provided in the configuration file. An aspect of the solution is the configuration file's ability to identify dependencies among the plurality of components. This identification includes detailing the inputs and outputs of each component and how they interact with one another. For example, the orchestrator component of the pipeline software is responsible for interpreting the configuration file and arranging the components in the specified sequence. The configuration file might specify that specific utility components, such as HTTP parsers, data validators, and payload flatteners, are to be positioned before the wrapped AI model to preprocess and validate input data. These components ensure the data is correctly formatted and validated before the AI model processes. Similarly, the configuration file may identify specific components that are to be positioned after the AI model to handle output data processing. These components might include structural validators and data converters, which ensure that the output data meets the standards and is in the correct format for storage or further use. The orchestrator coordinates the output of each utility component to ensure it is correctly input to the interface of the wrapped AI model and subsequently processed by downstream components. This coordination is based on the detailed instructions in the configuration file, which specify how each component is to interact with the others, ensuring efficient data flow through the production pipeline.

The instant solution is designed to streamline the deployment of AI model production pipelines by incorporating custom code into the pipeline, ensuring integration and efficient operation. The processor receives a configuration file that defines the component configurations. The configuration file specifies the sequence of components, including any custom code to be integrated into the production pipeline. The processor generates a production pipeline for the AI model, incorporating a sequence of components that includes the wrapped AI model and at least one utility component connected to the interface. The configuration file dictates the sequence and configuration of these components. An aspect of the solution is the capability to handle custom code provided by developers. The configuration file may include custom code that is to be integrated into the production pipeline. The processor generates an adaptor component specifically for the custom code to accommodate this custom code. The adaptor component wraps the custom code similarly to how the AI model is wrapped, providing a standardized interface that allows the custom code to communicate with other components in the pipeline. The adaptor component is then inserted into the sequence of components within the production pipeline as specified in the configuration file. For example, the orchestrator component of the pipeline software retrieves the custom code from the configuration file and generates an adaptor component. This adaptor component ensures that the custom code can interact with pre-built utility components and the wrapped AI model. The custom code may perform specific tasks such as data transformation, additional validation, or specialized processing not covered by the standard utility components. The orchestrator inserts this adaptor component into the correct position within the production pipeline sequence, ensuring that the custom code's output is correctly input into the interface of the wrapped AI model or other downstream components. This integration allows the custom code to enhance the pipeline's functionality without disrupting the data flow. Once the production pipeline is configured, including the custom code wrapped in an adaptor component, the processor executes it on input data via the software application to generate inference results.

The instant solution generates a production pipeline for the AI model, incorporating a sequence of components that includes the wrapped AI model and at least one utility component connected to the interface. These utility components might include HTTP parsers, payload flatteners, data validators, and structural validators, which are used in converting and validating input data before it reaches the AI model. The solution stores component log messages from these utility components in a central log system. This functionality is achieved by utilizing predefined code within each utility component, which directs the logging messages to a central log system. This centralized logging mechanism ensures that all log messages generated during the execution of the production pipeline are collected in a single location, facilitating monitoring and troubleshooting. For example, the orchestrator component of the pipeline software is responsible for arranging the components in the specified sequence and ensuring that each component's output is correctly input to the interface of the wrapped AI model. As the production pipeline executes, each utility component logs its operations, errors, and other relevant information to the central log system. This logging includes standard utility components and custom components added via adaptor modules. Additionally, the wrapping of the AI model includes code that ensures the AI model logs messages to the central log system. The wrapping involves encapsulating the AI model's source code with additional functionality that redirects any logging calls within the AI model to the central logging system, ensuring that all aspects of the production pipeline, including the AI model, are comprehensively logged. The centralized log system serves as a repository for all logging messages, providing a unified view of the entire production pipeline's operations, enabling developers and operators to monitor the pipeline's performance, identify and troubleshoot errors, and maintain an audit trail of all activities.

The instant solution automates the deployment of AI model production pipelines, ensuring comprehensive logging and error handling. The processor receives a configuration file that defines the component configurations. This configuration file specifies the sequence of components, their dependencies, and how they interact within the production pipeline. Upon receiving an AI model, which includes source code, binary code, software endpoints, and configuration information, the processor wraps the AI model into a wrapped AI model. This wrapping process involves creating an interface, such as an API, that provides standardized access to the AI model, ensuring it can communicate with other components within the production pipeline. The solution stores component log messages from utility components in a central log system by utilizing predefined code within each utility component, which directs the logging messages to the central log system. The processor configures each utility component to include this predefined code, ensuring that all operations, errors, and relevant information are logged centrally. The processor is configured to wrap the source code of the AI model with an envelope that includes additional code. This envelope code causes the AI model to store its log messages in the central log system. By intercepting the AI model's internal logging calls, the envelope redirects these calls to the central log system, ensuring comprehensive logging of the AI model's operations. This centralized logging mechanism provides a unified view of all log messages generated during the execution of the production pipeline, facilitating monitoring, troubleshooting, and ensuring transparency.

The orchestrator component of the pipeline software manages the sequence of components. It arranges the utility components and the wrapped AI model according to the configuration file, ensuring that data flows seamlessly from one component to the next. As the production pipeline executes, the central log system continuously collects log messages from each component, including the wrapped AI model. This log data can be used for real-time monitoring, historical analysis, and troubleshooting any issues that arise during the pipeline's operation. Once the production pipeline is fully configured, the processor executes it on input data via the software application to generate inference results. The comprehensive logging facilitated by the central log system ensures that any anomalies or errors are promptly recorded and can be addressed efficiently. The centralized nature of the logging system also aids in maintaining an audit trail, which is used for compliance and regulatory purposes.

In one example, the instant solution modularly deploys AI models in a production environment with dynamic component selection based on model requirements. The solution includes a memory communicably coupled to a processor, where the processor is configured to store a repository of utility components within the storage of a software application. These components include HTTP parsers, payload flatteners, data validators, and structural validators. Upon receiving an AI model comprising source code, binary code, software endpoints, and configuration information, the processor dynamically selects and integrates the appropriate utility components based on the specifics of the AI model as defined in a configuration file. The configuration file outlines the components and their sequence. The processor wraps the AI model into a standardized format, creating a wrapped AI model with an interface that provides access to the AI model. The orchestrator then generates a production pipeline, dynamically selecting utility components before and after the AI model based on the configuration file, ensuring the AI model receives correctly formatted and validated input data and produces standardized output data.

In another example, the instant solution automates validation and compliance monitoring within the AI model production pipeline. The solution includes a memory communicably coupled to a processor configured to manage a repository of utility components and a central log system. Upon receiving an AI model and a configuration file, the processor wraps the AI model into a standardized format, creating a wrapped AI model with an interface for communication. The configuration file includes regulatory requirements and compliance checks that are to be integrated into the production pipeline. The processor generates the production pipeline, incorporating utility components such as data validators, bias check modules, and compliance monitoring components. These components ensure that the input data is validated against regulatory standards and that the AI model's outputs are checked for compliance and bias. The central log system collects log messages from all components, providing a comprehensive audit trail and facilitating compliance reporting.

In another example, the instant solution adapts and integrates custom components within the AI model production pipeline. The solution comprises a memory communicably coupled to a processor, which stores a library of pre-built utility components and a framework for integrating custom components. Upon receiving an AI model and a configuration file, the processor wraps the AI model into a wrapped AI model with a standardized interface. The configuration file specifies the inclusion of custom code to address specific processing not covered by standard utility components. The processor generates an adaptor component for the custom code, ensuring it communicates with other components in the pipeline. The orchestrator arranges standard utility and custom adaptor components in the sequence defined by the configuration file. During pipeline execution, the system can adapt in real time to changing data inputs and processing requirements, leveraging the flexibility the custom components provide. Log messages from all components, including custom ones, are stored in a central log system for unified monitoring and troubleshooting.

The instant solution automates component deployment recommendations for AI production pipeline orchestration, bridging the model development and deployment environments. The solution includes a memory and a processor coupled to the memory, where the processor is configured to perform functions for deploying AI models in a production environment. The processor stores utility components within the storage of a software application, which are used in creating a flexible and efficient AI pipeline. These utility components may include but are not limited to, HTTP data parsers, payload flatteners, data validators, and structure validators, all of which facilitate the transformation and validation of input data for the AI model. Upon receiving a configuration file defining the component configurations, the processor receives an AI model. This model can include source code, binary code, software endpoints, and configuration information. To ensure integration into the production pipeline, the processor wraps the AI model into a wrapped AI model. The wrapping process includes creating an interface, such as an API, that provides standardized access to the AI model, thereby facilitating communication and interoperability with other pipeline components.

The solution generates a production pipeline for the AI model. The pipeline includes a sequence of components integrating the wrapped AI model and at least one utility component connected to the interface. The sequence and inclusion of components are based on the configurations specified in the configuration file. The production pipeline is designed to process input data through various stages, using the AI model to generate an inference result. The solution validates the production pipeline based on regulatory requirements. The processor determines whether the production pipeline meets one or more regulatory requirements, which may involve bias checking, data scrubbing, and regression testing, ensuring that the deployed AI model and its associated pipeline comply with legal and ethical standards.

The instant solution is configured to train a second AI model using neural network capabilities. The second AI model is trained based on components of previous pipelines, source code from these pipelines, and model feedback data. The purpose of this second AI model is to analyze the source code of the first AI model and determine the most suitable utility components to include in the production pipeline. The second AI model can make informed recommendations by leveraging historical data and feedback and optimizing the deployment process. The processor executes the second AI model on the source code of the first AI model to identify the appropriate utility components, ensuring that the production pipeline is tailored to the specifics of the AI model, enhancing its performance and reliability. The processor also receives feedback about the utility components in the production pipeline via the software application's GUI. The input generates a model feedback record, which is then added to the model feedback data. The second AI model is retrained periodically using this updated feedback data, ensuring continuous improvement and adaptation of the pipeline recommendations.

The instant solution is configured to deploy AI models in production environments by incorporating a feedback mechanism to ensure continuous improvement and adaptation of the AI pipeline. This mechanism leverages user feedback to iteratively enhance the selection and configuration of utility components in the production pipeline. The solution trains a second AI model using neural network capabilities. The second AI model is trained on data from previous pipelines, including their components, source code, and model feedback data. The second AI model analyzes the source code of the first AI model and recommends the most appropriate utility components for the production pipeline, optimizing the deployment process. The processor also receives feedback about the utility components included in the production pipeline. The feedback is gathered via a GUI of the software application. Users can provide feedback on various aspects of the pipeline's performance, including the utility components' effectiveness, the AI model's accuracy, and any encountered issues. The feedback received generates a model feedback record, which is then added to the model feedback data. The processor periodically retrains the second AI model using this updated feedback data, refining its recommendations and ensuring that the production pipeline remains effective and current with evolving requirements.

The instant solution is configured to determine the appropriate utility components to include in the production pipeline based on the AI model's model type and model parameters. The processor analyzes the characteristics of the AI model, such as its architecture, input requirements, output format, and any specific parameters that influence its operation. By understanding these details, the processor can select utility components that complement the AI model, ensuring optimal performance and compatibility. For instance, if the AI model is designed for natural language processing, the processor might include text parsing and tokenization components. Alternatively, if the model is for image recognition, the processor may select components that manage image preprocessing and feature extraction. This intelligent selection process ensures that the production pipeline is functional and optimized for the specific AI model it supports. The processor's capability to customize the pipeline based on the AI model's characteristics significantly reduces the time and effort to deploy AI models in production environments. Developers do not configure each component manually; instead, they can rely on the processor's automated analysis and selection process, which ensures that the most suitable utility components are used.

The instant solution is configured to wrap the AI model with an envelope to create a standardized and interoperable format known as a wrapped AI model. This wrapping process ensures that the AI model can integrate with other components in the production pipeline and facilitates communication and data exchange within the pipeline. The solution includes a memory and a processor coupled to the memory, where the processor is configured to perform several tasks for deploying AI models in a production environment. The processor stores utility components within the storage of a software application. These components, such as HTTP data parsers, payload flatteners, data validators, and structure validators, are used in transforming and validating input data for the AI model. Upon receiving a configuration file that defines the component configurations and an AI model from a development environment, the processor wraps the AI model into an envelope, encapsulating the AI model's source code, binary code, software endpoints, and configuration information within an additional layer of code. This layer includes an interface, such as an API, that provides standardized access to the AI model's functionality. The wrapped AI model can communicate and interact with other components in the production pipeline, ensuring interoperability and compatibility. By wrapping the AI model, the solution standardizes the AI model's format, making it easier to integrate into diverse production environments regardless of the original development framework or programming language. The envelope includes predefined code modules that facilitate logging, error handling, and other operational aspects for a production-grade pipeline. By incorporating these modules, the wrapped AI model has built-in capabilities to generate and store log messages, handle errors gracefully, and perform other functions for reliable operation in a production environment. Once the AI model is wrapped, the processor generates a production pipeline incorporating the wrapped AI model and at least one utility component based on the configuration file. The configuration file determines the sequence of components in the production pipeline, ensuring that the pipeline is tailored to the specific requirements of the AI model and the application.

The instant solution is configured to ensure that the deployment of AI models in production environments meets regulatory requirements through a comprehensive validation process. The validation process includes bias checking, data scrubbing, and regression testing to ensure the AI model and its associated pipeline comply with legal and ethical standards. The processor performs the validation process to determine whether the production pipeline satisfies at least one regulatory requirement. To ensure compliance, the processor conducts various checks, including bias checking, data scrubbing, and regression testing. Bias checking involves analyzing the AI model's output to detect potential biases that may lead to unfair or discriminatory outcomes. The processor may use historical data, user feedback, and statistical analysis to identify and mitigate biases, ensuring that the AI model operates fairly and ethically. Data scrubbing is another validation step, where the processor verifies that the input data has been properly cleaned and preprocessed. This process ensures that the data is free from errors, duplicates, and personally identifiable information (PII) that are not to be included in the analysis. The processor checks that these steps are performed correctly to maintain data integrity and privacy. The processor checks that the data does not include outdated information that may affect the model's accuracy and reliability. The processor performs regression testing to ensure that the AI model operates on the most recent and pertinent data. If the production pipeline satisfies the regulatory requirements based on these checks, the processor executes the pipeline on input data via the software application, generating an inference result.

The instant solution automatically pauses and issues warnings when a production AI pipeline fails to meet regulatory requirements, ensuring the deployment adheres to legal and ethical standards. Upon receiving a configuration file that defines the component configurations and an AI model from a development environment, the processor wraps the AI model into a standardized format. This wrapping process involves encapsulating the AI model's source code, binary code, software endpoints, and configuration information within an additional layer of code. This layer includes an interface, such as an API, that provides standardized access to the AI model's functionality, ensuring integration with other pipeline components. The processor then generates a production pipeline for the AI model, incorporating the wrapped AI model and the utility components based on the configuration file. The production pipeline is designed to process input data through various stages, using the AI model to generate an inference result. The solution also validates the production pipeline against regulatory requirements. The processor performs checks for bias, data scrubbing, and regression testing to ensure compliance. Bias checking involves analyzing the AI model's output to detect and mitigate potential biases. Data scrubbing ensures that the input data is free from errors, duplicates, and PII. Regression testing verifies that the data used by the AI model is current and relevant. If the production pipeline does not satisfy at least one regulatory requirement, the processor is configured to pause the pipeline automatically. This pause prevents the AI model from generating further outputs until the issues are resolved, ensuring non-compliant data or biased results are not produced. In addition to pausing the pipeline, the processor displays a warning via the software application's GUI. The warning alerts users to the specific regulatory requirements that were not met, providing detailed information about the validation failures. The GUI allows users to take corrective actions, such as adjusting the configuration file, modifying the utility components, or retraining the AI model to address the identified issues.

In one example, the instant solution automates the deployment of AI models in production environments with a dynamic selection of utility components based on the model's specific characteristics. The solution includes a memory and a processor coupled to the memory. Upon receiving a configuration file and an AI model from a development environment, the processor wraps the AI model into a standardized format, creating an interface that ensures integration with other components. The processor then dynamically selects utility components from a stored repository based on the AI model's type and parameters. For instance, if the AI model is designed for image recognition, the processor might include image preprocessing and feature extraction components. This dynamic selection ensures the production pipeline is optimized for the AI model's specific requirements, enhancing performance and compatibility. Additionally, the processor continuously updates the selection criteria based on feedback and evolving model characteristics, ensuring the pipeline remains efficient and effective.

In another example, the instant solution provides a continuous feedback loop to optimize AI model deployment in production environments. The processor deploys the AI model by wrapping it into a standardized format and generating a production pipeline with utility components. It also incorporates a mechanism for receiving and utilizing feedback. Users provide feedback via a GUI on the effectiveness of the utility components and the overall pipeline performance. The feedback is used to create model feedback records, which are then added to a database. The processor retrains a secondary AI model using the updated feedback data. The secondary AI model analyzes the feedback and refines its recommendations for selecting and configuring utility components in the production pipeline.

In another example, the instant solution ensures regulatory compliance when deploying AI models. The processor receives a configuration file, and an AI model wraps the model into a standardized format and generates a production pipeline incorporating the utility components. The processor validates the process by checking the production pipeline against regulatory requirements, including bias checking, data scrubbing, and regression testing. If the pipeline fails to meet any regulatory standards, the processor automatically pauses the pipeline to prevent the generation of non-compliant outputs. The processor issues a detailed warning via a GUI, alerting users to specific regulatory breaches. The interface allows users to take corrective actions, such as modifying the configuration file or retraining the AI model.

In another example of the instant solution, utility components are stored within a storage of the software application. These utility components may include HTTP parsers, payload flatteners, data validators, structural validators, and other pre-developed modules for operationalizing the AI pipeline. The storage acts as a repository, ensuring that these components are readily available for use in various production pipelines without additional development effort. A utility configuration file is received that defines the component configurations for these utility components. This configuration file, which may be formatted in a common markup language or object notation, or similar, specifies the sequence, dependencies, inputs, and outputs of the utility components, ensuring that they are correctly integrated and function cohesively within the production pipeline.

An AI model is received that comprises one or more of source code, binary code, and configuration information, providing the details for its deployment and operation. This model can be developed in various programming languages and trained using diverse datasets, reflecting its adaptability and versatility. A production pipeline configuration is received that defines the specific setup for the production pipeline of the AI model, detailing how the AI model and utility components will interact, the sequence of operations, and the data flow from input to output.

The AI model is wrapped with one or more of the utility components. This wrapping process standardizes the format of the AI model and integrates it with the utility components, creating a wrapped AI model. The wrapping may involve adding an interface, such as an API, to the AI model, enabling smooth communication and data exchange between the model and other components within the pipeline. A production pipeline is generated for the AI model within the software application based on the production pipeline configuration and the utility configuration file. This production pipeline includes a sequence of components, incorporating the wrapped AI model and at least one utility component as defined by the configurations in the configuration file. The pipeline orchestrator retrieves components from the repository, arranging them in the specified sequence, and ensuring all dependencies and interactions are correctly set up.

The production pipeline is executed for the AI model on input data via the software application to generate an inference result. During execution, the input data is processed through the sequence of components, where each utility component and the AI model perform their designated functions. The processed data, now an inference result, is stored or outputted by the production pipeline configuration.

In another example of the instant solution, utility components are stored for a production environment within a storage of the software application. These utility components, which may include HTTP parsers, payload flatteners, data validators, structural validators, and other pre-developed modules, are used in operationalizing an AI pipeline. The storage repository ensures these components are readily available for integration into various production pipelines, thereby eliminating additional development efforts.

An AI model is received via a software application from a development environment. This AI model comprises one or more elements, such as source code, binary code, and configuration information. The model, developed and trained in the development environment, is transferred to the production environment. Upon receiving the AI model, at least one utility component is determined from among the stored utility components to include with the AI model. This determination is based on the specific requirements of the AI model and the production pipeline configuration. The selected utility components are those that facilitate the model's integration, processing, and operationalization within the production environment.

The AI model is wrapped with one or more of these utility components. This wrapping process involves standardizing the format of the AI model and integrating it with the utility components to create a wrapped AI model. The wrapping may involve adding an interface, such as an API, to the AI model, which enables smooth communication and data exchange between the model and other components within the production pipeline.

With the wrapped AI model prepared, a production pipeline is generated of the AI model. This production pipeline includes a sequence of components, incorporating the wrapped AI model and the selected utility components. The orchestrator facilitates this wrapping process by retrieving the components from the storage, arranging them in the specified sequence, and ensuring all dependencies and interactions are correctly established.

The production pipeline of the AI model is executed on input data via the software application in the production environment. During execution, the input data is processed through the sequence of components, where each utility component and the AI model perform their designated functions. The processed data, now an inference result, is then stored or outputted by the production pipeline configuration.

The instant solution reduces the need for manual intervention, thereby streamlining the deployment process and allowing for rapid, consistent implementation across diverse computational landscapes. This automation is particularly impactful in handling the complexities associated with scaling AI models in cloud environments, where dynamic resource allocation and load balancing are critical.

The instant solution optimizes the deployment pipeline, ensuring that data flows seamlessly through a series of pre-configured and custom components. This not only reduces latency but also enhances the system's fault tolerance, particularly in high-volume logging scenarios where the integrity and timeliness of log data are important. The centralized logging mechanism, integrated within the cloud infrastructure, captures and processes log messages from all pipeline components without compromising system performance.

The instant solution offers a unique combination of components involved in the AI model wrapping process. This process standardizes the model format by encapsulating it within an envelope that includes an interface, such as an API, which ensures seamless integration and communication with other components in the pipeline. This wrapping mechanism is pivotal as it not only simplifies the deployment process but also enables the system to adapt the AI model to various computational environments without requiring significant modifications to the model itself.

The dynamic selection and arrangement of pipeline components represent a significant advancement over existing solutions. Unlike traditional methods that rely on static configurations, the instant solution allows for the real-time adjustment of pipeline components based on the specific requirements of the AI model and the data being processed. This dynamic capability ensures optimal resource utilization and minimizes bottlenecks, thereby improving overall system efficiency. The orchestrator component 130 plays a crucial role in this process by intelligently managing the sequence and dependencies of the components, ensuring that data flows efficiently through the pipeline 136 with minimal latency.

The centralized logging mechanism is designed to capture and store log messages from all components in the pipeline, including the wrapped AI model, in a unified manner. The centralized logging facilitates comprehensive monitoring and troubleshooting and enhances fault tolerance by ensuring that all logs are recorded accurately, even under high-volume conditions.

The pipeline orchestrator 130, which meticulously manages the sequence and interaction of components, ensures that data transitions smoothly from one stage to the next. This orchestration is particularly critical in scenarios involving complex data preprocessing, model inference, and post-processing, where the timing and coordination of component interactions directly impact the system's overall performance and reliability.

A granular examination of the data flow reveals that the orchestrator dynamically adjusts the sequence of components based on real-time data characteristics and model requirements. For example, when dealing with large-scale datasets that require extensive preprocessing, the orchestrator may prioritize the execution of data parsers and validators before the data reaches the AI model ensuring that the data is in the optimal format for model processing and minimizes the risk of errors that could arise from improperly formatted inputs.

Error handling within the pipeline is another area where the instant solution provides a clear technical advantage. The system is designed to detect and address errors at multiple stages of the pipeline, ensuring that any issues are logged and handled without interrupting the overall data flow. For example, if a data validation component encounters an anomaly, the orchestrator 130 can redirect the data to a custom error-handling module, which logs the error and applies predefined correction mechanisms before reintroducing the data into the pipeline.

In a cloud-based AI application designed for real-time financial data analysis, the ability to dynamically configure the pipeline components allows the system to efficiently handle both small, high-frequency transactions and large, complex batch processes. The orchestrator can adjust the pipeline to prioritize speed and accuracy for smaller transactions, while simultaneously managing the computational load required for processing larger datasets. This flexibility ensures that the system remains responsive and reliable under varying workloads, a critical requirement for financial applications where both speed and precision are paramount.

The integration of custom components further enhances the versatility of the solution. Developers can introduce custom preprocessing modules, such as specialized data scrubbing tools or advanced feature engineering algorithms, which can be seamlessly integrated into the existing pipeline. The orchestrator handles these custom components with the same precision as the built-in utilities, ensuring that they operate within the broader framework without introducing additional complexity. This capability allows the system to be tailored to specific use cases, providing a clear technical advantage in environments that require bespoke processing solutions.

The instant solution operates within a cloud computing environment by leveraging advanced methods and algorithms designed to dynamically select and configure pipeline components, ensuring optimal performance and adaptability across diverse workloads. The solution employs a sophisticated orchestration mechanism that intelligently manages the data flow through the pipeline, dynamically adjusting the sequence and configuration of components based on real-time analysis of incoming data and the specific requirements of the AI model being deployed.

In a cloud environment, where computational resources and data loads can vary significantly, the solution's orchestrator 130 plays a pivotal role in maintaining efficiency and reliability. The orchestrator utilizes algorithms that assess the characteristics of the input data—such as size, complexity, and format—and determines the most appropriate configuration of components to process the data. For example, in scenarios where the data includes large, unstructured datasets, the orchestrator may prioritize the use of advanced preprocessing components like data scrubbing and feature extraction modules before the data is fed into the AI model.

A practical use illustrating the solution's advantages could involve a cloud-based AI system for real-time fraud detection in financial transactions. In this scenario, the pipeline might need to process a combination of high-frequency, low-latency transaction data alongside large, historical datasets used for model retraining. The orchestrator 130 may dynamically configure the pipeline to prioritize speed and accuracy for real-time transactions, utilizing lightweight data parsers and validators, while managing the more intensive processing required for historical data analysis. This dynamic reconfiguration ensures that the system remains responsive and efficient, regardless of the workload, providing a clear technical advantage in environments where both speed and accuracy are critical.

Figure 6A:
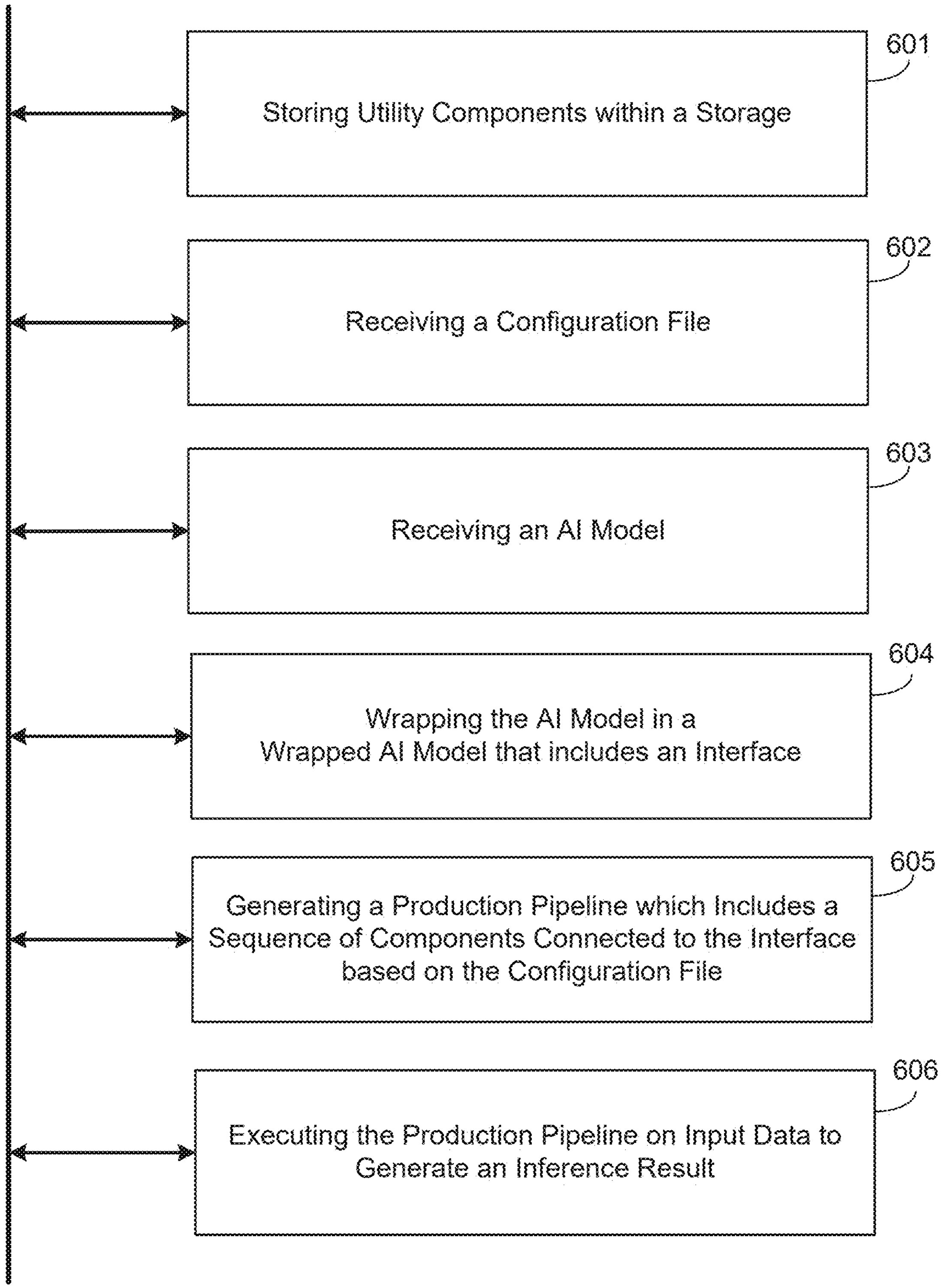
FIGS. 6A-6B are diagrams illustrating a method of automatically deploying a production AI pipeline according to examples and features of the instant solution.

FIG. 6A illustrates a method 600 of automatically deploying a production AI pipeline according to examples and features of the instant solution. For example, the method 600 may be performed by at least one processor. For example, the at least one processor may be of a host platform such as a cloud platform, a web server, a software application, a combination of servers and platforms, and the like. Referring to FIG. 6A, in 601, the method may include storing utility components within a storage of a software application. In 602, the method may include receiving a configuration file defining component configurations.

In 603, the method may include receiving an artificial intelligence (AI) model which comprises one or more of source code, binary code, software end points, and configuration information. In 604, the method may include wrapping the AI model into a wrapped AI model that includes an interface that provides access to the AI model. In 605, the method may include generating a production pipeline for the AI model which includes a sequence of components including the wrapped AI model and at least one utility component connected to the interface based on the component configurations included in the configuration file. In 606, the method may include executing the production pipeline for the AI model on input data via the software application to generate an inference result.

Figure 6B:
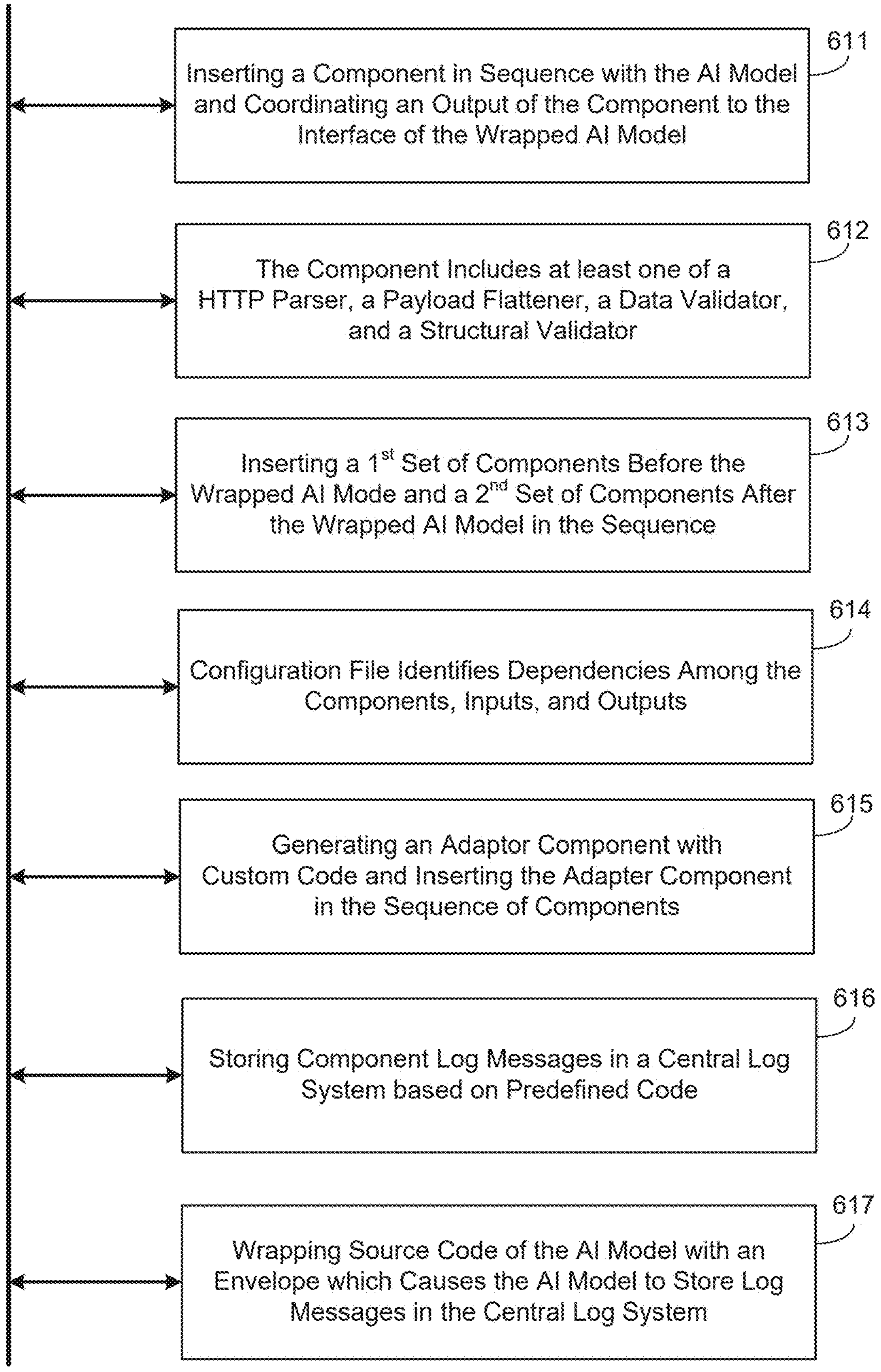

FIG. 6B illustrates a method 610 of automatically deploying a production AI pipeline according to examples and features of the instant solution. For example, the method 610 may be performed by at least one processor. For example, the at least one processor may be of a host platform such as a cloud platform, a web server, a software application, a combination of servers and platforms, and the like. Referring to FIG. 6B, in 611, the method may include inserting the at least one utility component in sequence with the wrapped AI model among the sequence of components in the production pipeline and coordinating an output of the at least one utility component to input to the interface of the wrapped AI model based on instructions in the configuration file. In 612, the at least one utility component may include at least one of a hypertext transfer protocol (HTTP) parser, a payload flattener, a data validator, and a structural validator.

In 613, the method may include inserting a first set of utility components before the wrapped AI model in the sequence of components and inserting a second set of utility components after the wrapped AI model in the sequence of components to generate the production pipeline for the AI model. In 614, the configuration file may identify dependencies among a plurality of components, inputs of respective components in the plurality of components, and outputs of the respective components in the plurality of components. In 615, the configuration file may include custom code which is input via a computing system, and the method may include generating an adaptor component for the custom code and inserting the adaptor component into the sequence of components within the production pipeline.

In 616, the at least one utility component may include predefined code and the method may further include storing component log messages from the at least one utility component in a central log system based on the predefined code. In 617, the wrapping may include wrapping source code of the AI model with an envelope that includes code which causes the AI model to store model log messages in the central log system.

Figure 7A:
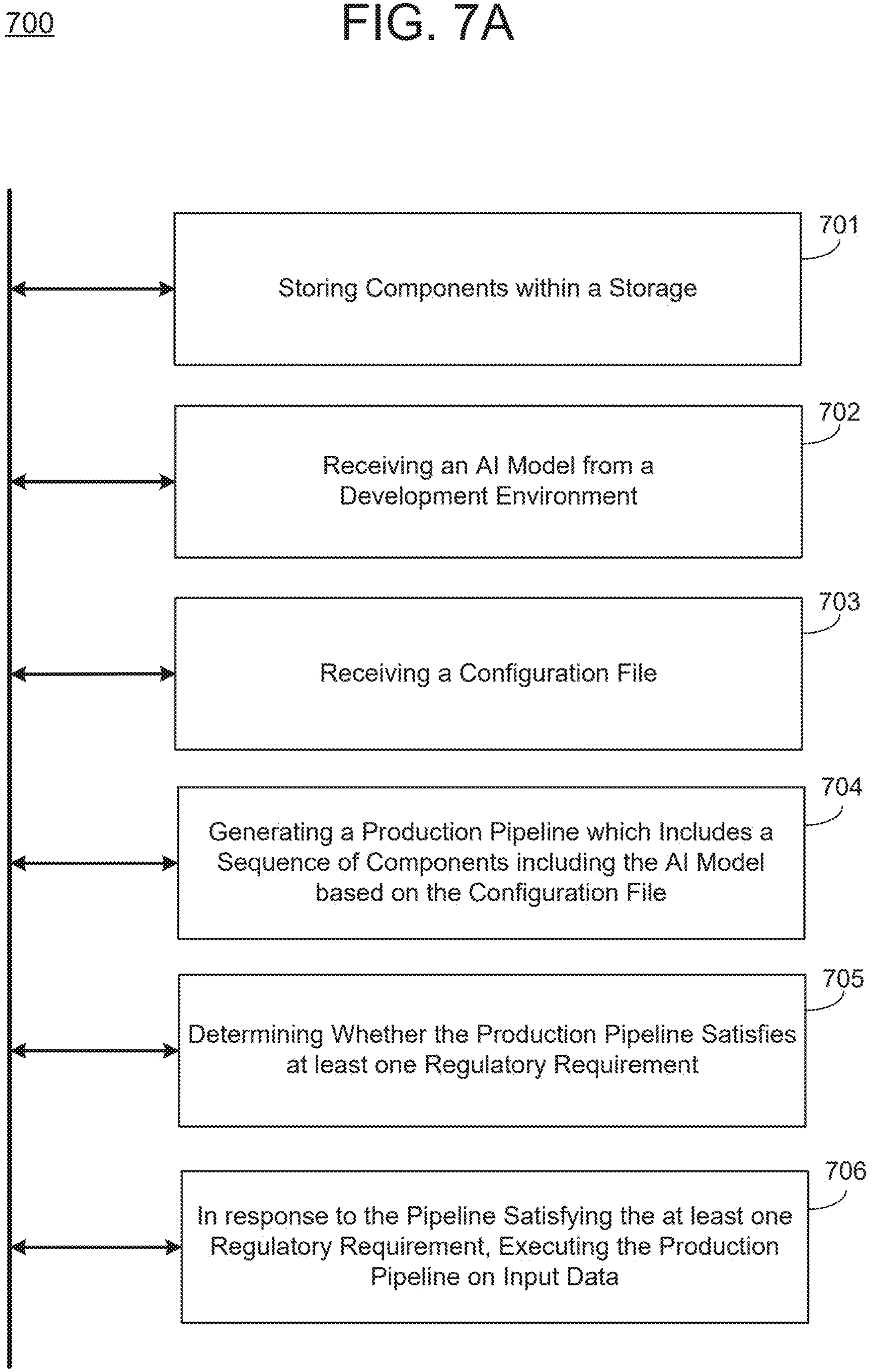
FIGS. 7A-7B are diagrams illustrating a method of validating a production pipeline based on regulatory requirements according to examples and features of the instant solution.

FIG. 7A illustrates a method 700 of validating a production pipeline based on regulatory requirements according to examples and features of the instant solution. For example, the method 700 may be performed by at least one processor. For example, the at least one processor may be of a host platform such as a cloud platform, a web server, a software application, a combination of servers and platforms, and the like. Referring to FIG. 7A, in 701, the method may include storing utility components for a production environment within a storage. In 702, the method may include receiving, via a software application, an artificial intelligence (AI) model from a development environment. In 703, the method may include receiving a configuration file defining a configuration of a pipeline in the production environment which includes the AI model.

In 704, the method may include generating, via the software application, a production pipeline of the AI model which includes a sequence of components including the AI model and at least one utility component from the utility components based on the configuration file. In 705, the method may include determining whether the production pipeline satisfies one or more regulatory requirements based on the sequence of components. In 706, in response to the production pipeline satisfying the one or more regulatory requirements, the method may include executing the production pipeline of the AI model on input data via the software application in the production environment.

Figure 7B:
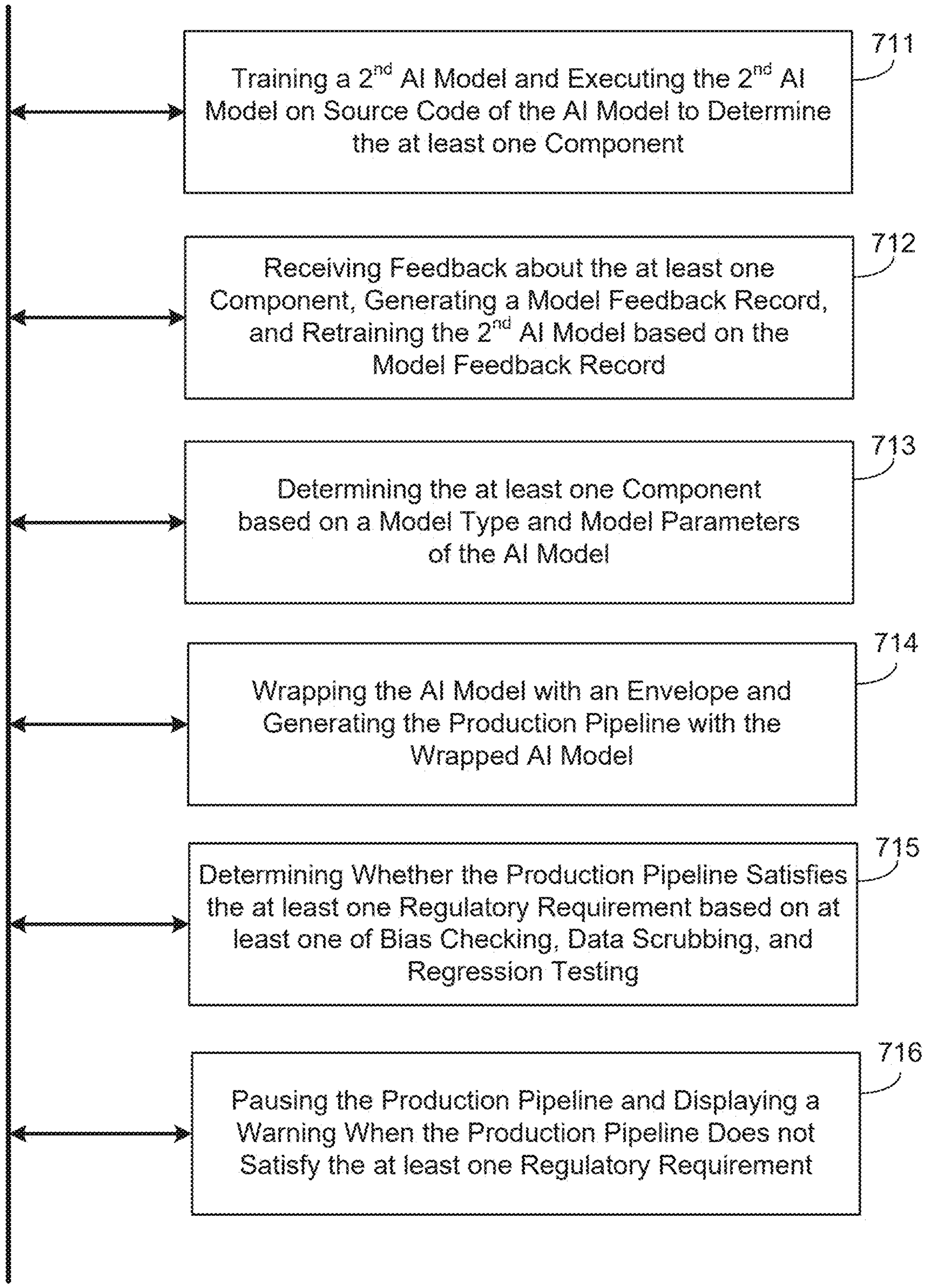

FIG. 7B illustrates a method 710 of validating a production pipeline based on regulatory requirements according to examples and features of the instant solution. For example, the method 710 may be performed by at least one processor. For example, the at least one processor may be of a host platform such as a cloud platform, a web server, a software application, a combination of servers and platforms, and the like. Referring to FIG. 7B, in 711, the method may include training a second AI model using a neural network capability based on at least one of components of previous pipelines, source code of the previous pipelines, and model feedback data, and executing the second AI model on source code of the AI model to determine the at least one utility component.

In 712, the method may further include receiving feedback about the at least one utility component in the production pipeline of the AI model via a graphical user interface of the software application, generating a model feedback record based on the feedback and the at least one utility component, adding the model feedback record to the model feedback data, and retraining the second AI model based on the model feedback data with the model feedback record added thereto. In 713, the method may include determining the at least one utility component from among the utility components to include with the AI model based on a model type of the AI model and model parameters of the AI model. In 714, the method may further include wrapping the AI model with an envelope to generate a wrapped AI model, and generating the production pipeline with the wrapped AI model interspersed among the sequence of components.

In 715, the method may include determining whether the production pipeline satisfies the at least one regulatory requirement based on at least one of bias checking, data scrubbing, and regression testing being included within the sequence of components of the production pipeline. In 716, in response to the production pipeline not satisfying the at least one regulatory requirement, the method may further include pausing the production pipeline and displaying a warning via a graphical user interface of the software application.

Figure 8:
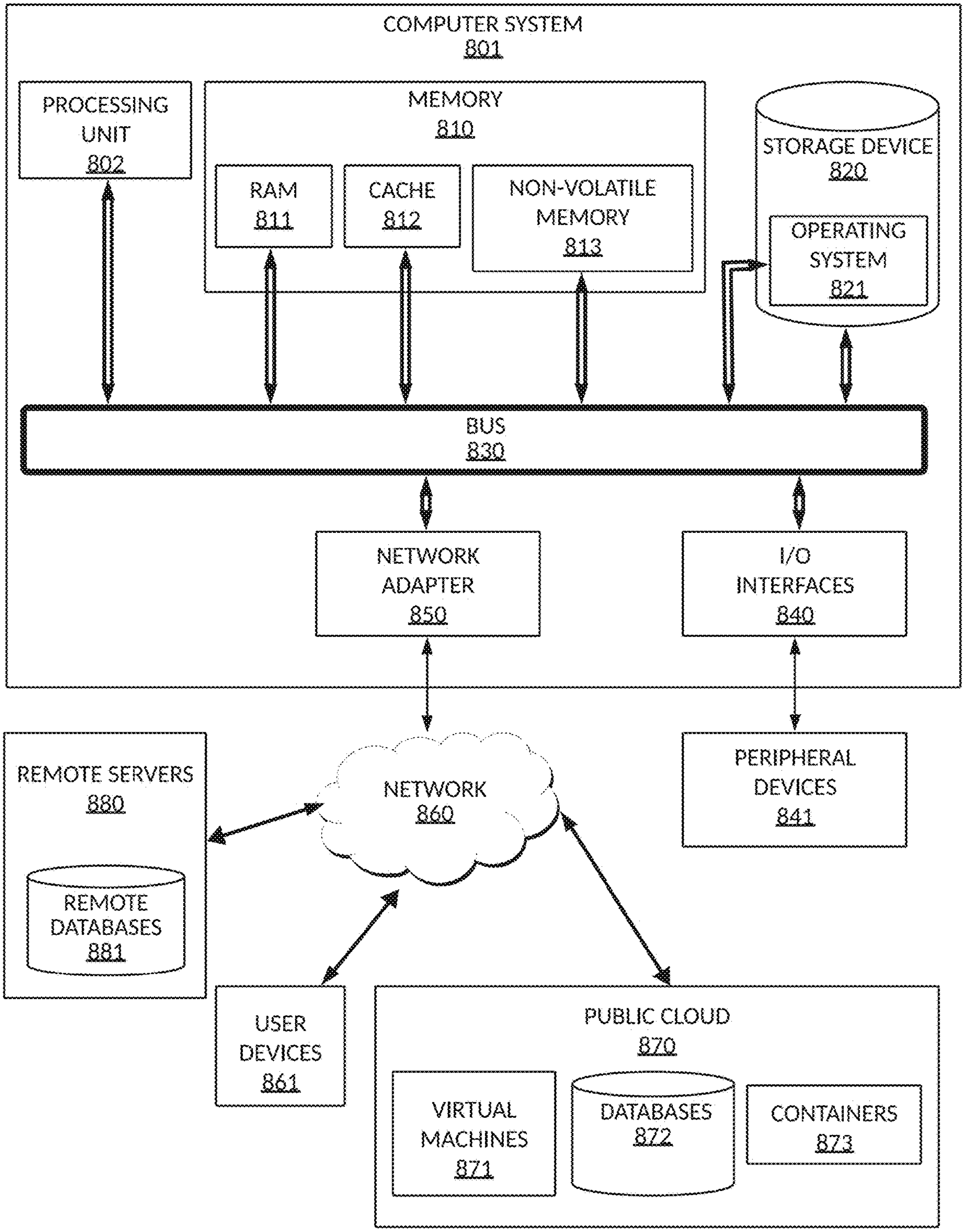
FIG. 8 is a system diagram illustrating a computing environment according to the instant solution's example features, structures, or characteristics.

The examples and features of the instant solution may be implemented in one or more of the elements described or depicted herein, including for example, the elements described or depicted in FIG. 8. These examples and features may further be implemented in hardware, in a computer program executed by a processor, in firmware, or in a combination of the above. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art.

An exemplary storage medium may be communicatively coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components. For example, FIG. 8 illustrates an example computer system architecture, which may represent or be integrated in any of the above-described components, etc.

FIG. 8 illustrates a computing environment according to the instant solution's example features, structures, or characteristics. FIG. 8 is not intended to suggest any limitation as to the scope of use or functionality of features, structures, or characteristics of the instant solution of the application described herein. Regardless, the computing environment 800 can be implemented to perform any of the functionalities described herein. In computing environment 800, there is a computer system 801, operational within numerous other general-purpose or special-purpose computing system environments or configurations.

Computer system 801 may take the form of a desktop computer, laptop computer, tablet computer, smartphone, smartwatch or other wearable computer, server computer system, thin client, thick client, network computer system, minicomputer system, mainframe computer, quantum computer, and distributed cloud computing environment that include any of the described systems or devices, and the like or any other form of computer or mobile device now known or to be developed in the future that is capable of running a program, accessing a network 860 or querying a database. Depending upon the technology, the performance of a computer-implemented method may be distributed among multiple computers and among multiple locations. However, in this presentation of the computing environment 800, a detailed discussion is focused on a single computer, specifically computer system 801, to keep the presentation as simple as possible.

Computer system 801 may be located in a cloud, even though it is not shown in a cloud in FIG. 8. On the other hand, computer system 801 may not be in a cloud except to any extent as may be affirmatively indicated. Computer system 801 may be described in the general context of computer system-executable instructions, such as program modules, executed by a computer system 801. Generally, program modules may include routines, programs, objects, components, logic, data structures, and so on that perform tasks or implement certain abstract data types. As shown in FIG. 8, computer system 801 in computing environment 800 is shown in the form of a general-purpose computing device. The components of computer system 801 may include but are not limited to, at least one processor or processing unit 802, a system memory 810, and a bus 830 that couples various system components, including system memory 810 to processing unit 802.

Processing unit 802 includes at least one computer processor of any type now known or to be developed. The processing unit 802 may contain circuitry distributed over multiple integrated circuit chips. The processing unit 802 may also implement multiple processor threads and multiple processor cores. Cache 812 is a memory that may be in the processor chip package(s) or located "off-chip," as depicted in FIG. 8. Cache 812 is typically used for data or code accessed by the threads or cores running on the processing unit 802. In some computing environments, processing unit 802 may be designed to work with qubits and perform quantum computing.

Memory 810 is any volatile memory now known or to be developed in the future. Examples include dynamic random-access memory (RAM) 811 or static type RAM 811. Typically, the volatile memory is characterized by random access, but this may not be the characterization unless affirmatively indicated. In computer system 801, memory 810 is in a single package. It is internal to computer system 801, but alternatively or additionally, the volatile memory may be distributed over multiple packages and/or located externally with respect to computer system 801. By way of example, memory 810 can be provided for reading from and writing to a non-removable, non-volatile magnetic media (shown as storage device 820, and typically called a "hard drive"). Memory 810 may include at least one program product having a set (e.g., at least one) of program modules configured to carry out the functions of various features, structures, or characteristics of the instant solution of the application. A typical computer system 801 may include cache 812, a specialized volatile memory generally faster than RAM 811 and generally located closer to the processing unit 802. Cache 812 stores frequently accessed data and instructions accessed by the processing unit 802 to speed up processing time. The computer system 801 may also include non-volatile memory 813 in the form of ROM, PROM, EEPROM, and flash memory. Non-volatile memory 813 often contains programming instructions for starting the computer, including the basic input/output system (BIOS) and information to start the operating system 821.

Computer system 801 may include a removable/non-removable, volatile/non-volatile computer storage device 820. For example, storage device 820 can be a non-removable, non-volatile magnetic media (not shown and typically called a "hard drive"). At least one data interface can connect it to the bus 830. In features, structures, or characteristics of the instant solution where computer system 801 has a large amount of storage (for example, where computer system 801 locally stores and manages a large database), then this storage may be provided by peripheral storage devices 820 designed for storing very large amounts of data, such as a storage area network (SAN) that is shared by multiple, geographically distributed computers.

The operating system 821 is software that manages computer system 801 hardware resources and provides common services for computer programs. Operating system 821 may take several forms, such as various known proprietary operating systems or open-source Portable Operating System Interface type operating systems that employ a kernel.

The bus 830 represents at least one of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 830 is the signal conduction path that allows the various components of computer system 801 to communicate.

Computer system 801 may communicate with at least one peripheral device, 841, via an input/output (I/O) interface, 840. Such devices may include a keyboard, a pointing device, a display, etc.; at least one device that enables a user to interact with computer system 801; and/or any devices (e.g., network card, modem, etc.) that enable computer system 801 to communicate with at least one other computing devices. Such communication can occur via I/O interface 840. As depicted, I/O interface 840 communicates with the other components of computer system 801 via bus 830.

Network adapter 850 enables the computer system 801 to connect and communicate with at least one network 860, such as a local area network (LAN), a wide area network (WAN), and/or a public network (e.g., the Internet). It bridges the computer's internal bus 830 and the external network, exchanging data efficiently and reliably. The network adapter 850 may include hardware, such as modems or Wi-Fi signal transceivers, and software for packetizing and/or de-packetizing data for communication network transmission. Network adapter 850 supports various communication protocols to ensure compatibility with network standards. Ethernet connections adhere to protocols such as IEEE 802.3, while wireless communications might support IEEE 802.11 standards, Bluetooth, near-field communication (NFC), or other network wireless radio standards.

Network 860 is any computer network that can receive and/or transmit data. Network 860 can include a WAN, LAN, private cloud, or public Internet, capable of communicating computer data over non-local distances by any technology that is now known or to be developed in the future. Any connection depicted can be wired and/or wireless and may traverse other components that are not shown. In some features, structures, or characteristics of the instant solution, a network 860 may be replaced and/or supplemented by LANs designed to communicate data between devices in a local area, such as a Wi-Fi network. The network 860 typically includes computer hardware such as copper transmission cables, optical transmission fibers, wireless transmission, routers, firewalls, switches, gateway computers, edge servers, and network infrastructure known now or to be developed in the future. Computer system 801 connects to network 860 via network adapter 850 and bus 830.

User devices 861 are any computer systems used and controlled by an end user in connection with computer system 801. For example, in a hypothetical case where computer system 801 is designed to provide a recommendation to an end user, this recommendation may typically be communicated from network adapter 850 of computer system 801 through network 860 to a user device 861, allowing user device 861 to display, or otherwise present, the recommendation to an end user. User devices can be a wide array, including personal computers, laptops, tablets, hand-held, mobile phones, etc.

A public cloud 870 is an on-demand availability of computer system resources, including data storage and computing power, without direct active management by the user. Public clouds 870 are often distributed, with data centers in multiple locations for availability and performance. Computing resources on public clouds 870 are shared across multiple tenants through virtual computing environments comprising virtual machines 871, databases 872, containers 873, and other resources. A container 873 is an isolated, lightweight software for running a software application on the host operating system 821. Containers 873 are built on top of the host operating system's kernel and contain software applications and some lightweight operating system APIs and services. In contrast, virtual machine 871 is a software layer with an operating system 821 and kernel. Virtual machines 871 are built on top of a hypervisor emulation layer designed to abstract a host computer's hardware from the operating software environment. Public clouds 870 generally offers databases 872, abstracting high-level database management activities. At least one element described or depicted in FIG. 8 can perform at least one of the actions, functionalities, or features described or depicted herein.

Remote servers 880 are any computers that serve at least some data and/or functionality over a network 860, for example, WAN, a virtual private network (VPN), a private cloud, or via the Internet to computer system 801. These networks 860 may communicate with a LAN to reach users. The user interface may include a web browser or a software application that facilitates communication between the user and remote data. Such software applications have been referred to as "thin" desktop software applications or "thin clients." Thin clients typically incorporate software programs to emulate desktop sessions. Mobile device software applications can also be used. Remote servers 880 can also host remote databases 881, with the database located on one remote server 880 or distributed across multiple remote servers 880. Remote databases 881 are accessible from database client applications installed locally on the remote server 880, other remote servers 880, user devices 861, or computer system 801 across a network 860. An AI/ML model described or depicted here may reside fully or partially on any of the elements described or depicted in FIG. 8.

Although an exemplary example of the instant solution of at least one of an apparatus, method, and computer readable medium has been illustrated in the accompanying drawings and described in the foregoing detailed description, it will be understood that the instant solution is not limited to the examples of the instant solution disclosed but is capable of numerous rearrangements, modifications, and substitutions as set forth and defined by the following claims. For example, the instant solution's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that the instant solution may be embodied as a personal computer, a server, a console, a personal digital assistant (PDA), a cell phone, a tablet computing device, a smartphone, or any other suitable computing device, or combination of devices. Presenting the above-described functions as being performed by the instant solution is not intended to limit the scope of the present instant solution in any way but is intended to provide one example of the many examples of the instant solution. Indeed, methods, systems, and apparatuses disclosed herein may be implemented in localized and distributed forms consistent with computing technology.

It should be noted that some of the instant solution features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module may not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory, tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the instant solution, as generally described and illustrated in the figures herein, may be arranged and designed in a wide variety of different configurations. Thus, the detailed descriptions of the instant solution and the examples and features of the instant solution are not intended to limit the scope of the instant solution as claimed but are merely representative examples of the instant solution.

One having ordinary skill in the art will readily understand that the above may be practiced with steps in a different order and/or with hardware elements in configurations that are different from those which are disclosed. Therefore, although the instant solution has been described based upon these preferred examples and features of the instant solution, it would be apparent to those of skill in the art that certain modifications, variations, and alternative constructions would be apparent.

While preferred examples of the present instant solution have been described, it is to be understood that the examples described are illustrative, and the scope of the instant solution is to be defined solely by the appended claims when considered with a full range of equivalents and modifications (e.g., protocols, hardware devices, software platforms, etc.) thereto.

What is claimed is:

1. An apparatus, comprising:

a memory; and a processor, wherein the processor and the memory are communicatively coupled, the processor configured to:

store utility components within a storage of a software application, receive a configuration file defining component configurations, receive an artificial intelligence (AI) model which comprises at least one of source code, binary code, software end points, and configuration information, wrap the AI model into a wrapped AI model that includes an interface that provides access to the AI model, generate a production pipeline for the AI model which includes a sequence of components including the wrapped AI model and at least one utility component connected to the interface based on the component configurations included in the configuration file, and execute the production pipeline for the AI model on input data via the software application to generate an inference result.

2. The apparatus of claim 1, wherein the processor is configured to insert the at least one utility component in sequence with the wrapped AI model among the sequence of components in the production pipeline and coordinate an output of the at least one utility component to input to the interface of the wrapped AI model based on instructions in the configuration file.

3. The apparatus of claim 1, wherein the at least one utility component comprises at least one of a hypertext transfer protocol (HTTP) parser, a payload flattener, a data validator, and a structural validator.

4. The apparatus of claim 1, wherein the processor is configured to insert a first set of utility components before the wrapped AI model in the sequence of components and insert a second set of utility components after the wrapped AI model in the sequence of components to generate the production pipeline for the AI model.

5. The apparatus of claim 1, wherein the configuration file identifies dependencies among a plurality of components, inputs of respective components in the plurality of components, and outputs of the respective components in the plurality of components, wherein an AI agent modifies the configuration file for the production pipeline to generate the inference result.

6. The apparatus of claim 1, wherein the configuration file comprises custom code which is input via a computing system, and the processor is further configured to generate an adaptor component for the custom code and inserting the adaptor component into the sequence of components within the production pipeline.

7. The apparatus of claim 1, wherein the at least one utility component comprises predefined code and the processor is further configured to store component log messages from the at least one utility component in a central log system based on the predefined code.

8. The apparatus of claim 7, wherein the processor is configured to wrap source code of the AI model with an envelope that includes code which causes the AI model to store model log messages in the central log system.

9. A method comprising:

storing utility components within a storage of a software application;

receiving a configuration file defining component configurations;

receiving an artificial intelligence (AI) model which comprises at least one of source code, binary code, software end points, and configuration information;

wrapping the AI model into a wrapped AI model that includes an interface that provides access to the AI model;

generating a production pipeline for the AI model which includes a sequence of components including the wrapped AI model and at least one utility component connected to the interface based on the component configurations included in the configuration file; and executing the production pipeline for the AI model on input data via the software application to generate an inference result.

10. The method of claim 9, wherein the generating comprises inserting the at least one utility component in sequence with the wrapped AI model among the sequence of components in the production pipeline and coordinating an output of the at least one utility component to input to the interface of the wrapped AI model based on instructions in the configuration file.

11. The method of claim 9, wherein the at least one utility component comprises at least one of a hypertext transfer protocol (HTTP) parser, a payload flattener, a data validator, and a structural validator.

12. The method of claim 9, wherein the generating comprises inserting a first set of utility components before the wrapped AI model in the sequence of components and inserting a second set of utility components after the wrapped AI model in the sequence of components to generate the production pipeline for the AI model.

13. The method of claim 9, wherein the configuration file identifies dependencies among a plurality of components, inputs of respective components in the plurality of components, and outputs of the respective components in the plurality of components, wherein an AI agent modifies the configuration file for the production pipeline to generate the inference result.

14. The method of claim 9, wherein the configuration file comprises custom code which is input via a computing system, and the generating comprises generating an adaptor component for the custom code and inserting the adaptor component into the sequence of components within the production pipeline.

15. The method of claim 9, wherein the at least one utility component comprises predefined code and the method further comprises storing component log messages from the at least one utility component in a central log system based on the predefined code.

16. The method of claim 15, wherein the wrapping comprises wrapping source code of the AI model with an envelope that includes code which causes the AI model to store model log messages in the central log system.

17. A computer-readable storage medium comprising instructions which when executed by a computer cause a processor to perform:

storing utility components within a storage of a software application;

receiving a configuration file defining component configurations;

receiving an artificial intelligence (AI) model which comprises at least one of source code, binary code, software end points, and configuration information;

wrapping the AI model into a wrapped AI model that includes an interface that provides access to the AI model;

generating a production pipeline for the AI model which includes a sequence of components including the wrapped AI model and at least one utility component connected to the interface based on the component configurations included in the configuration file; and executing the production pipeline for the AI model on input data via the software application to generate an inference result.

18. The computer-readable storage medium of claim 17, wherein the generating comprises inserting the at least one utility component in sequence with the wrapped AI model among the sequence of components in the production pipeline and coordinating an output of the at least one utility component to input to the interface of the wrapped AI model based on instructions in the configuration file.

19. The computer-readable storage medium of claim 17, wherein the at least one utility component comprises at least one of a hypertext transfer protocol (HTTP) parser, a payload flattener, a data validator, and a structural validator.

20. The computer-readable storage medium of claim 17, wherein the generating comprises inserting a first set of utility components before the wrapped AI model in the sequence of components and inserting a second set of utility components after the wrapped AI model in the sequence of components to generate the production pipeline for the AI model.

* * * * *